United States Patent
Zhang

(10) Patent No.: US 12,132,823 B2
(45) Date of Patent: Oct. 29, 2024

(54) COMMUNICATION AUTHENTICATION METHOD AND RELATED DEVICE

(71) Applicant: Huawei Technologies Co., Ltd., Shenzhen (CN)

(72) Inventor: Bo Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 256 days.

(21) Appl. No.: 17/706,877

(22) Filed: Mar. 29, 2022

(65) Prior Publication Data

US 2022/0255734 A1 Aug. 11, 2022

Related U.S. Application Data

(63) Continuation of application No. PCT/CN2020/118342, filed on Sep. 28, 2020.

(30) Foreign Application Priority Data

Sep. 30, 2019 (CN) .......................... 201910945857.3

(51) Int. Cl.
*H04L 9/08* (2006.01)
*H04L 9/32* (2006.01)

(52) U.S. Cl.
CPC .......... *H04L 9/0825* (2013.01); *H04L 9/0866* (2013.01); *H04L 9/0869* (2013.01); *H04L 9/3213* (2013.01)

(58) Field of Classification Search
CPC ... H04L 9/0825; H04L 9/0866; H04L 9/0869; H04L 9/3213; H04W 12/043; H04W 12/069; H04W 12/10
See application file for complete search history.

(56) References Cited

U.S. PATENT DOCUMENTS

2014/0051394 A1* 2/2014 Grech .................. H04L 63/105
455/411
2016/0255070 A1* 9/2016 Näslund ............... H04L 9/0816
713/171

FOREIGN PATENT DOCUMENTS

| CN | 103067345 A | 4/2013 |
|---|---|---|
| CN | 107205208 A | 9/2017 |

(Continued)

OTHER PUBLICATIONS

Akman, Gizem, Valtteri Niemi, and Ville Junnila. "Providing Identity Privacy in 5G Networks by Using Pseudonyms." (Year: 2018).*

(Continued)

*Primary Examiner* — John M MacIlwinen
(74) *Attorney, Agent, or Firm* — SLATER MATSIL, LLP

(57) ABSTRACT

A communication authentication method and a related device, the method including sending, by a user terminal, a generic bootstrapping architecture (GBA) authentication request carrying a user terminal identifier, receiving, by the user terminal, an authentication request carrying an authentication token (AUTN) and a random number (RAND), and deriving, by the user terminal, a first authentication vector based on the AUTN and the RAND, where the first authentication vector is different from a second authentication vector of the user terminal, the first authentication vector is a $5^{th}$ generation (5G) GBA authentication vector, and the second authentication vector includes at least one of a $3^{rd}$ generation/$4^{th}$ generation (3G/4G) GBA authentication vector or a 5G authentication vector.

15 Claims, 12 Drawing Sheets

(56) References Cited

FOREIGN PATENT DOCUMENTS

| CN | 111866871 A | 10/2020 |
|---|---|---|
| WO | 2008084135 A1 | 7/2008 |
| WO | 2016113593 A1 | 7/2016 |

OTHER PUBLICATIONS

Basin, David, et al. "A formal analysis of 5G authentication." Proceedings of the 2018 ACM SIGSAC conference on computer and communications security. (Year: 2018).*

Khan, Haibat, and Keith M. Martin. "On the Efficacy of New Privacy Attacks against 5G AKA." ICETE (2). (Year: 2019).*

"3rd Generation Partnership Project; Technical Specification Group Services and System Aspects; Study on authentication and key management for applications; based on 3GPP credential in 5G (Release 16)," 3GPP TR 33.835 V0.4.0, Mar. 2019, 64 pages.

"3rd Generation Partnership Project; Technical Specification Group Services and System Aspects; Study on authentication and key management for applications based on 3GPP credential in 5G (Release 16)," 3GPP TR 33.835 V1.0.1, Sep. 2019, 92 pages.

"3rd Generation Partnership Project; Technical Specification Group Services and System Aspects; 3G Security; Security architecture (Release 15)," 3GPP TS 33.102 V15.1.0, Dec. 2018, 77 pages.

"3rd Generation Partnership Project; Technical Specification Group Services and System Aspects; Generic Authentication Architecture (GAA); Generic Bootstrapping Architecture (GBA) (Release 16)," 3GPP TS 33.220 V16.0.0, 93 pages.

"Resovle Editor's note in Solution for bootstrapping authentication of AKMA," Source: Huawei, HiSilicon, Document for: Approval, Agenda Item: 8.5, 3GPP TSG SA WG3 (Security) Meeting #94, S3-190168 (revision of S3-18xabc), Kochi, India, Jan. 28-Feb. 1, 2019, 4 pages.

"New Solution: Efficient Key Derivation for end-to end Security," Source: KPN, Document for: Approval, Agenda Item: 5.5, 3GPP TSG-SA WG3 Meeting #94Ad-Hoc, S3-190926 (revision of S3-190613), Stockholm, Sweden, Mar. 11-15, 2019, 6 pages.

"Structure RAND for Authentication—HE part," ZTE Corporation, TEI15, Change Request, 33.102, 3GPP TSG-SA WG3 Meeting #95, S3-191197, Reno, US, May 6-10, 2019, 6 pages.

"Evaluation of solution 4," Source: Huawei, Hisilicon, Document for: Approval, Agenda Item: 8.5, 3GPP TSG SA WG3 (Security) Meeting #95, S3-191290 (revision S3-19abcd), Reno (US), May 6-10, 2019, 4 pages.

"Evaluation of solution 4," Source: Huawei, Hisilicon, Document for: Approval, Agenda Item: 8.13, 3GPP TSG SA WG3 (Security) Meeting #95, S3-192126 (revision S3-19abcd), Reno (US), May 6-10, 2019, 4 pages.

"New solution and evaluation: Integrating GBA to 5GC," Source: Ericsson, Vodafone, Document for: Approval Agenda Item: 8.3, 3GPP TSG-SA WG3 Meeting #96, S3-192881 (revision of S3-19xabc), Wroclaw (Poland), Aug. 26-30, 2019, 4 pages.

* cited by examiner

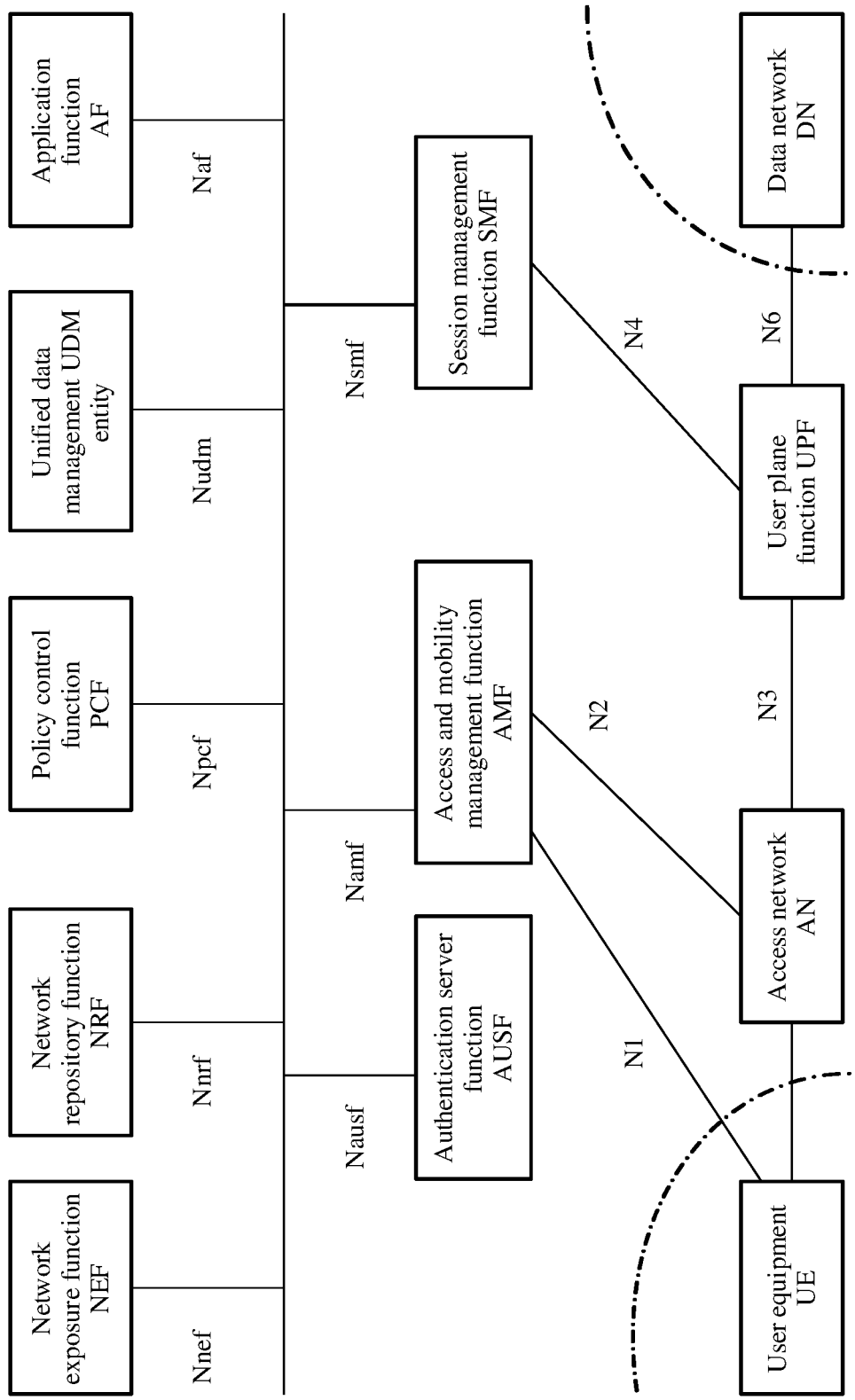
FIG. 1-A

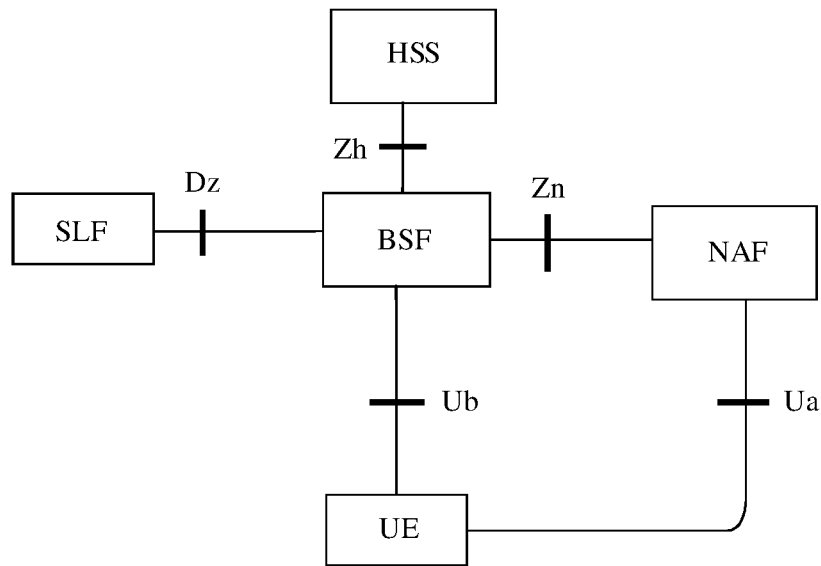
FIG. 1-B
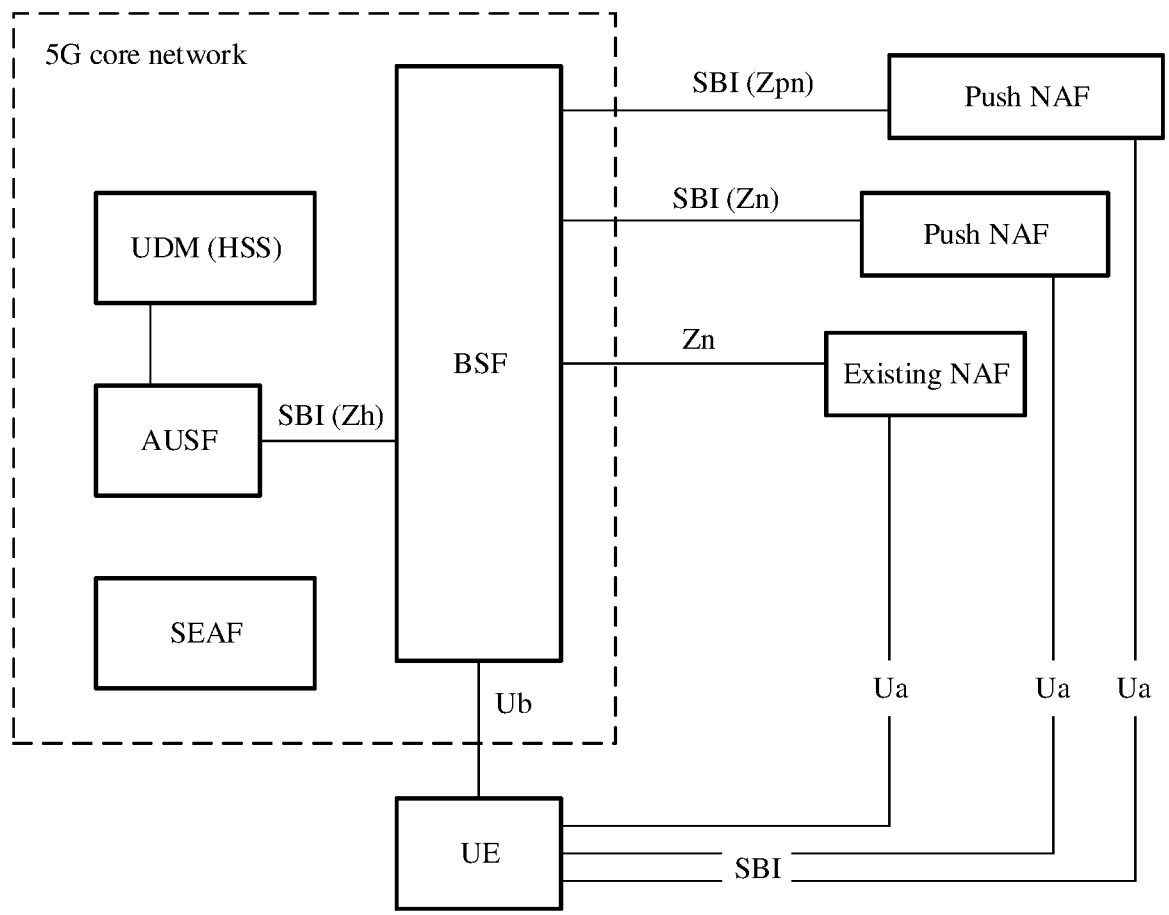
FIG. 1-C

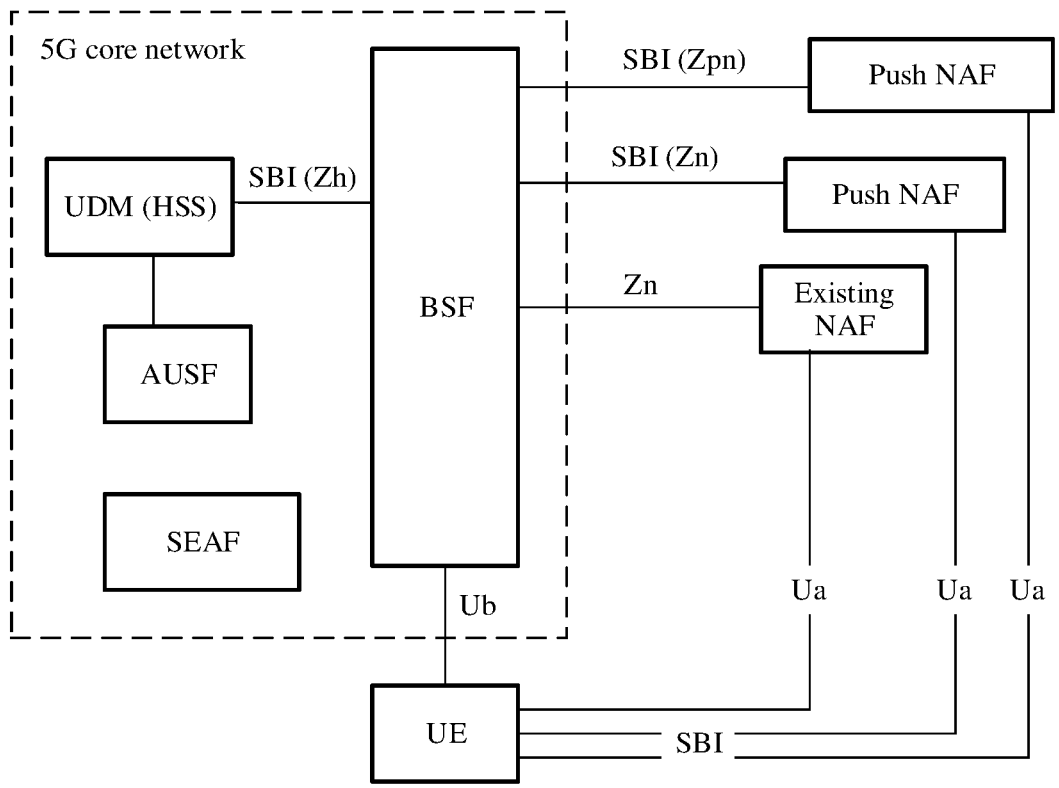
FIG. 1-D
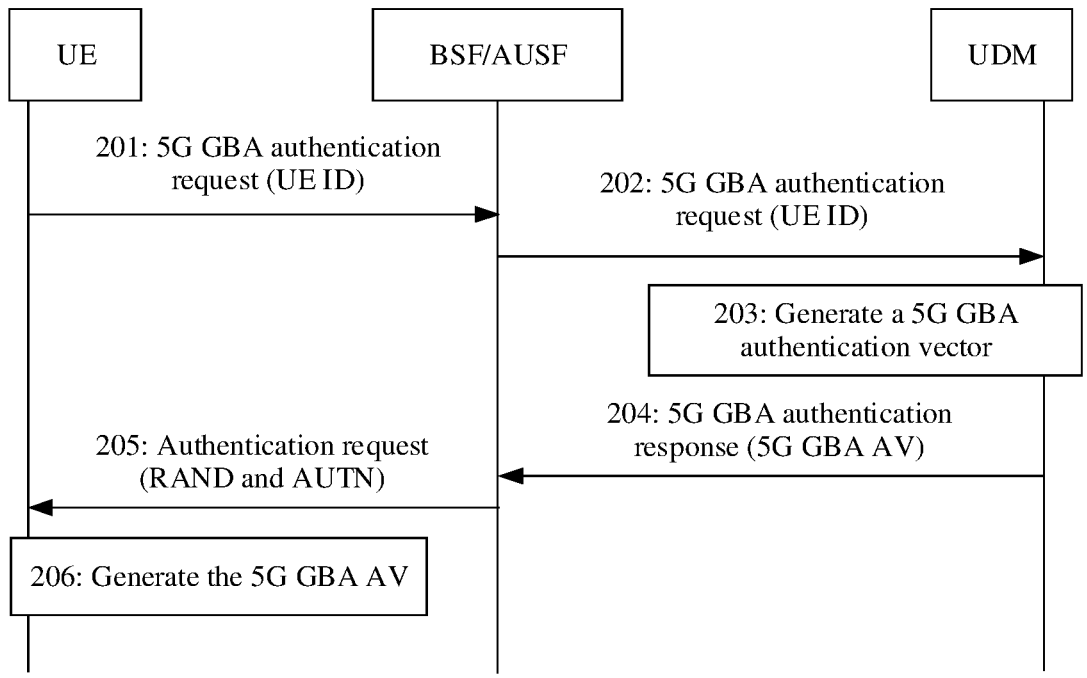
FIG. 2

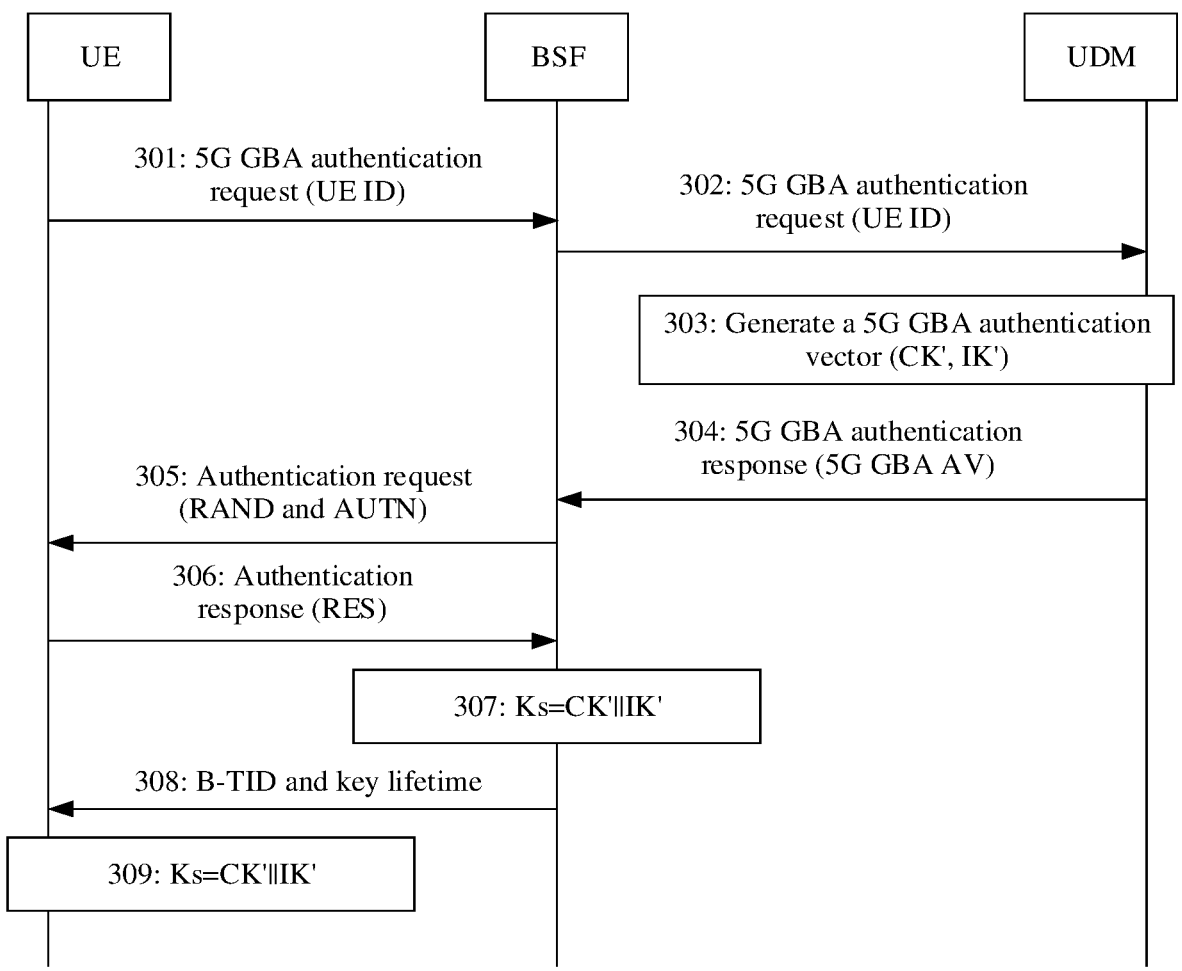
FIG. 3-A

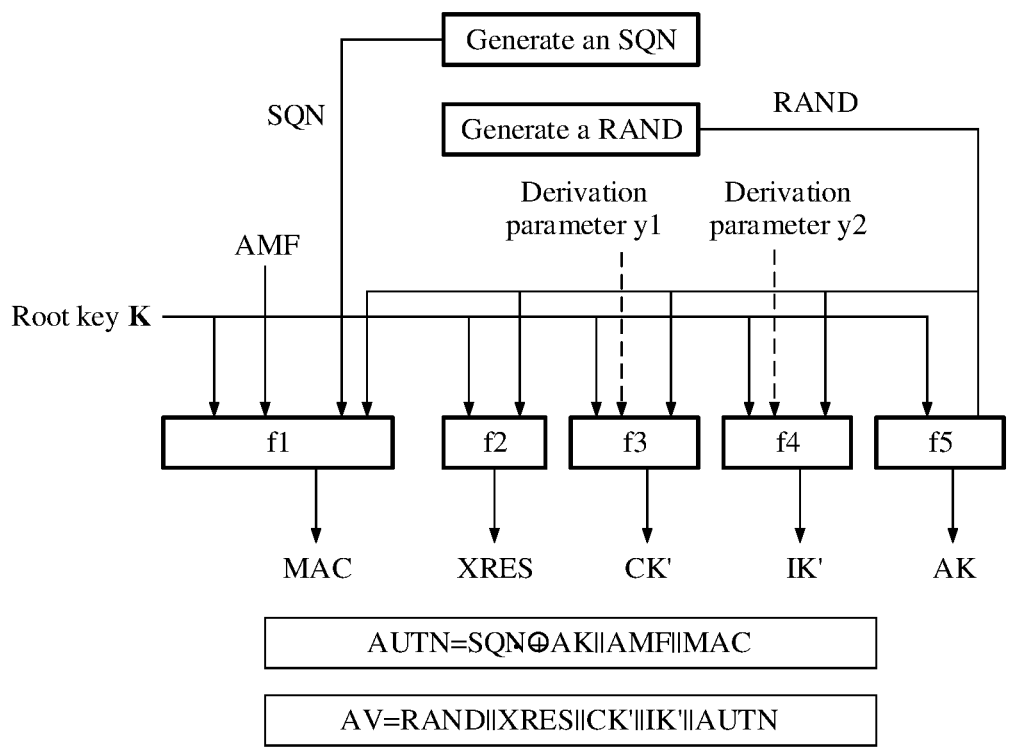
FIG. 3-B

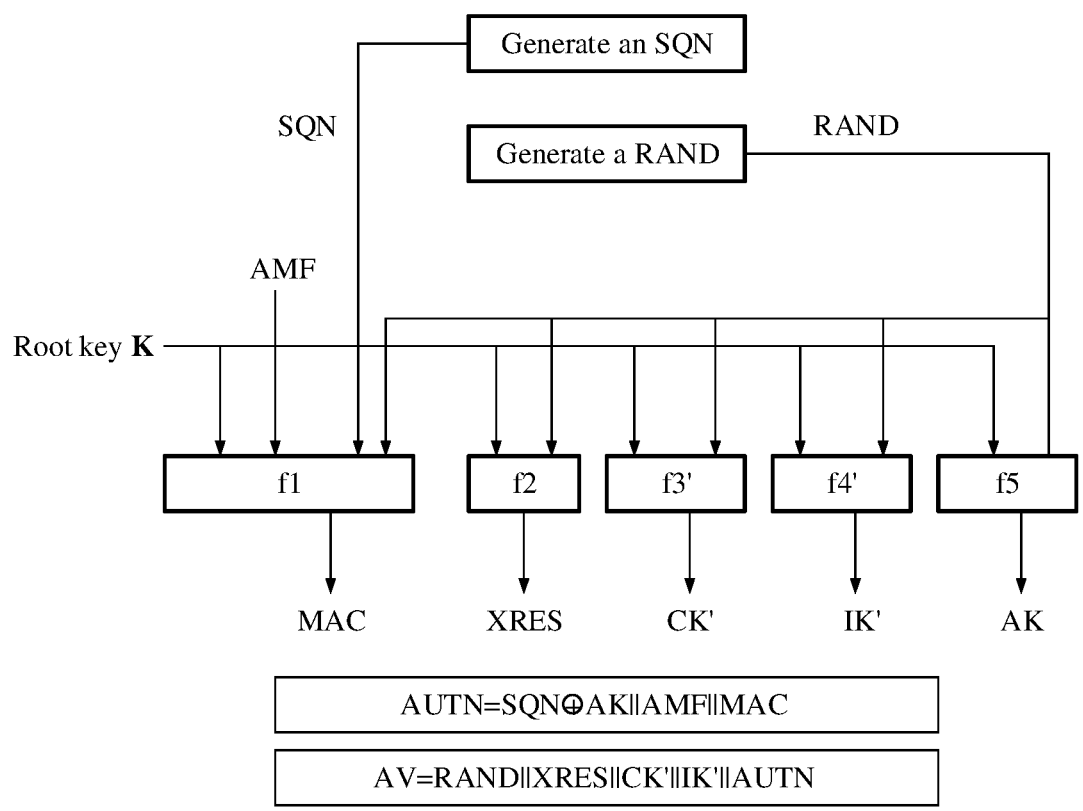
FIG. 3-C

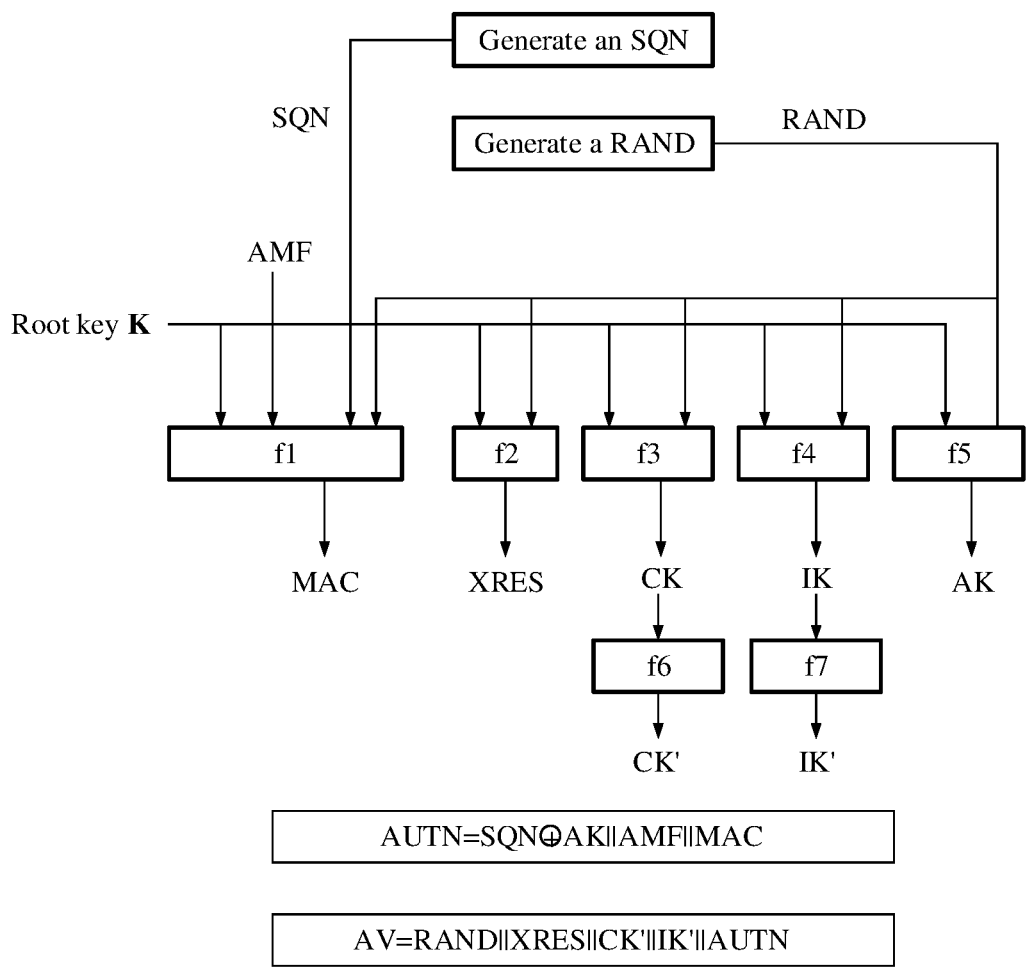
FIG. 3-D

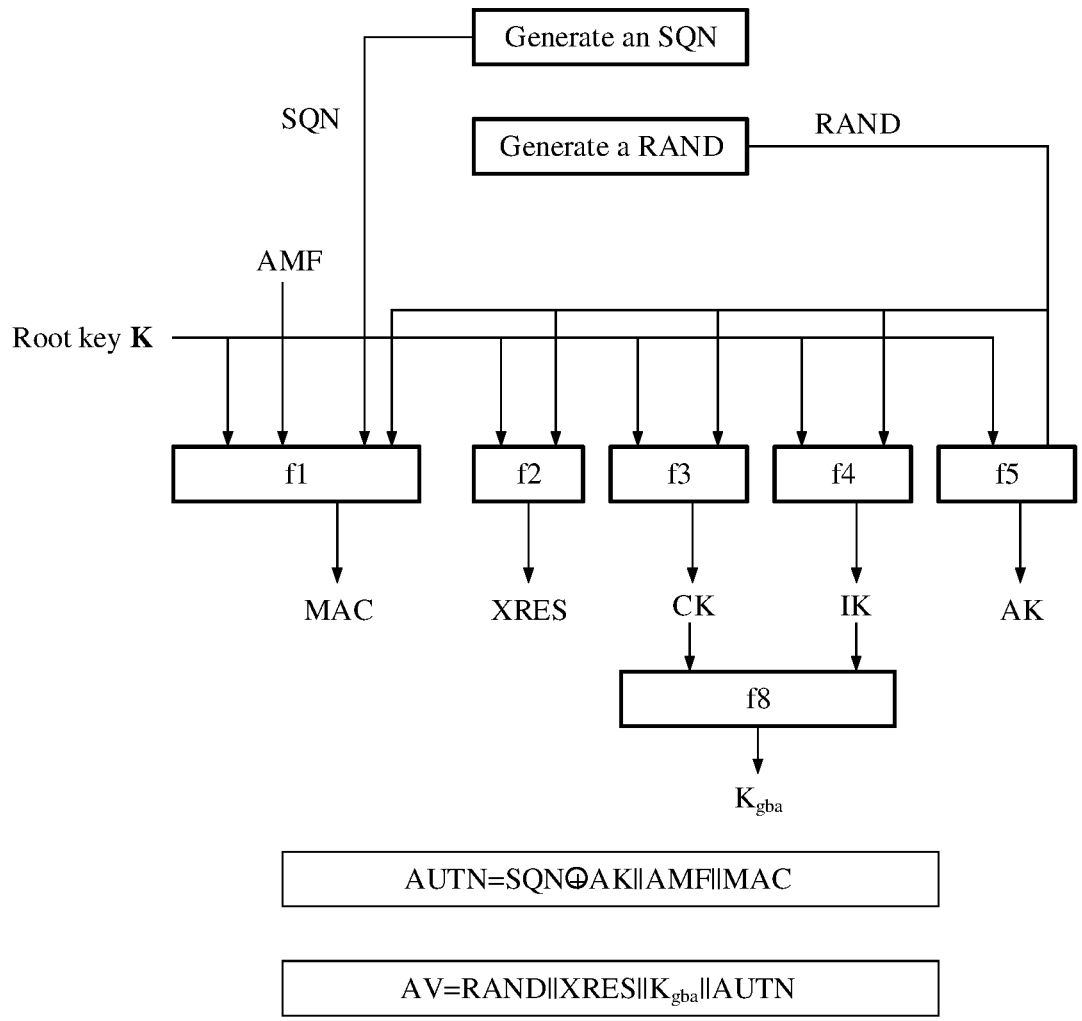
FIG. 3-E

COMMUNICATION AUTHENTICATION METHOD AND RELATED DEVICE

CROSS-REFERENCE TO RELATED APPLICATIONS

This application is a continuation of International Application No. PCT/CN2020/118342, filed on Sep. 28, 2020. The International Application claims priority to Chinese Application No. 201910945857.3, filed on Sep. 30, 2019. The disclosures of the aforementioned applications are hereby incorporated by reference in their entireties.

TECHNICAL FIELD

This application relates to the field of communication technologies, and in particular, to a communication authentication method and a related device.

BACKGROUND

A generic bootstrapping architecture (GBA) technology may be used to establish a security tunnel between a user terminal and an application server (NAF), to improve convenient and secure interaction between the NAF and the user terminal.

The 3rd generation partnership project (3GPP) shows a study of a manner in which the GBA technology is applied to a 3rd generation (3G) network and a 4th generation (4G) network. With gradual commercial use of a 5th generation (5G) network, how to apply the GBA technology to the 5G network has become a technical subject that needs to be studied in the industry.

SUMMARY

Embodiments of this application provide a communication authentication method and a related device.

According to a first aspect, an embodiment of this application further provides a communication authentication method, including a unified data management (UDM) entity receives a generic bootstrapping architecture (GBA) authentication request carrying a user terminal identifier (where the GBA authentication request may be sent by an authentication server function (AUSF) or a bootstrapping server function (BSF), the GBA authentication request has a function of requesting GBA authentication, but a specific message name of the GBA authentication request may be an authentication request, an access request, a registration request, or another message name). The UDM generates a first authentication vector of a user terminal represented by the user terminal identifier, where the first authentication vector is different from a second authentication vector of the user terminal, the first authentication vector is a 5G GBA authentication vector, and the second authentication vector includes one or more of the following authentication vectors: a 3G GBA authentication vector, a 4G GBA authentication vector, or a 5G authentication vector. The UDM sends a GBA authentication response carrying the first authentication vector.

It may be learned that, the foregoing example solution may implement GBA authentication in a 5G network, thereby helping lay a good foundation for applying a GBA technology to the 5G network. In addition, the foregoing solution facilitates isolation between the 5G GBA authentication vector and another authentication vector of the user equipment (UE). For example, a cipher key CK' and an integrity protection key IK' in the 5G GBA authentication vector may be isolated from a cipher key CK and an integrity protection key IK in the another authentication vector of the UE. This helps avoid abuse of, for example, the cipher key CK' and the integrity protection key IK'.

The first authentication vector may be an authentication vector with 5-tuple parameters or an authentication vector with 4-tuple parameters, and the second authentication vector may be an authentication vector with 5-tuple parameters or an authentication vector with 4-tuple parameters.

Specifically, for example, the first authentication vector is an authentication vector with 5-tuple parameters (CK', IK', RAND, AUTN, XRES), and the second authentication vector is an authentication vector with 5-tuple parameters (CK, IK, RAND, AUTN, XRES), where the cipher key CK' in the first authentication vector is different from the cipher key CK in the second authentication vector, and/or the integrity protection key IK' in the first authentication vector is different from the integrity protection key IK in the second authentication vector.

It may be understood that, there may be various manners to make the cipher key CK' in the first authentication vector different from the cipher key CK in the second authentication vector. For example, related derivation parameters and/or derivation functions are different. There may be various manners to make the integrity protection key IK' in the first authentication vector different from the integrity protection key IK in the second authentication vector. For example, related derivation parameters and/or derivation functions are different.

For example, parameters used to derive the cipher key CK' include the random number RAND, a root key K, and a derivation parameter $y_1$, and parameters used to derive the integrity protection key IK' include the RAND, the root key K, and a derivation parameter $y_2$, a derivation function $f_3'$ used to derive the CK' is different from a derivation function $f_3$ used to derive the CK, and a derivation function $f_4'$ used to derive the IK' is different from a derivation function $f_4$ used to derive the IK, the CK' and the IK' are derived from the CK, the IK, and an FC value, and the FC value is different from an FC value used to derive the second authentication vector, or a first SQN is to be used to derive the authentication token (AUTN) in the first authentication vector, and a second SQN is to be used to derive the AUTN in the second authentication vector. The first SQN and the second SQN each include a flag bit, and the flag bit of the first SQN is different from the flag bit of the second SQN, or the first SQN and the second SQN belong to different SQN segment intervals.

For another example, the first authentication vector is an authentication vector with 4-tuple parameters ($K_{ghm}$, RAND, AUTN, XRES), and the second authentication vector is an authentication vector with 5-tuple parameters (CK, IK, RAND, AUTN, XRES) or the second authentication vector is an authentication vector with 4-tuple parameters ($K_{ausf}$, RAND, AUTN, XRES).

Derivation parameters used to derive the key $K_{gba}$, for example, may include the cipher key CK, the integrity protection key IK, and a parameter $y_2$.

In some possible implementations, that UDM receives a GBA authentication request carrying a user terminal identifier includes: The UDM receives, from a BSF, the GBA authentication request carrying the user terminal identifier, or the UDM receives, from an AUSF, the GBA authentication request carrying the user terminal identifier.

In some possible implementations, that the UDM sends a GBA authentication response carrying the first authentication vector includes: The UDM sends the GBA authentication response carrying the first authentication vector to the AUSF, where the GBA authentication response is used to trigger the AUSF to derive a CK" by using the CK' and to derive an IK" by using the IK', or the GBA authentication response is used to trigger the AUSF to derive a $K_{gba}$' by using the $K_{gba}$, where at least one derivation parameter used to derive the $K_{gba}$' includes the parameter $y_2$.

In some possible implementations, the parameter $y_1$ or the parameter $y_2$ includes one or more of the following parameters: a string 5G GBA, a string GBA, a 5G GBA dedicated identifier, a BSF identifier, a 5G identifier, and a fresh parameter such as a counter, a nonce, or a sequence number.

According to a second aspect, an embodiment of this application further provides a unified data management (UDM) entity, including: a communication unit, configured to receive a generic bootstrapping architecture (GBA) authentication request carrying a user terminal identifier (where the GBA authentication request may be sent by an AUSF or a BSF), and a generation unit, configured to generate a first authentication vector of a user terminal represented by the user terminal identifier, where the first authentication vector is different from a second authentication vector of the user terminal, the first authentication vector is a 5G GBA authentication vector, and the second authentication vector includes a 3G/4G GBA authentication vector and/or a 5G authentication vector.

The communication unit is further configured to send a GBA authentication response carrying the first authentication vector.

It may be learned that, the foregoing example solution may implement GBA authentication in a 5G network, thereby helping lay a good foundation for applying a GBA technology to the 5G network. In addition, the foregoing solution facilitates isolation between the 5G GBA authentication vector and another authentication vector of the UE. For example, a cipher key CK' and an integrity protection key IK' in the 5G GBA authentication vector may be isolated from a cipher key CK and an integrity protection key IK in the another authentication vector of the UE. This helps avoid abuse of, for example, the cipher key CK' and the integrity protection key IK'.

The first authentication vector may be an authentication vector with 5-tuple parameters or an authentication vector with 4-tuple parameters, and the second authentication vector may be an authentication vector with 5-tuple parameters or an authentication vector with 4-tuple parameters.

Specifically, for example, the first authentication vector is an authentication vector with 5-tuple parameters (CK', IK', RAND, AUTN, XRES), and the second authentication vector is an authentication vector with 5-tuple parameters (CK, IK, RAND, AUTN, XRES), where the cipher key CK' in the first authentication vector is different from the cipher key CK in the second authentication vector, and/or the integrity protection key IK' in the first authentication vector is different from the integrity protection key IK in the second authentication vector.

It may be understood that, there may be various manners to make the cipher key CK' in the first authentication vector different from the cipher key CK in the second authentication vector. For example, related derivation parameters and/or derivation functions are different. There may be various manners to make the integrity protection key IK' in the first authentication vector different from the integrity protection key IK in the second authentication vector. For example, related derivation parameters and/or derivation functions are different.

For example, parameters used to derive the cipher key CK' include the random number RAND, a root key K, and a derivation parameter $y_1$, and parameters used to derive the integrity protection key IK' include the RAND, the root key K, and a derivation parameter $y_2$, a derivation function $f_3$' used to derive the CK' is different from a derivation function $f_3$ used to derive the CK, and a derivation function $f_4$' used to derive the IK' is different from a derivation function $f_4$ used to derive the IK, the CK' and the IK' are derived from the CK, the IK, and an FC value, and the FC value is different from an FC value used to derive the second authentication vector, or a first SQN is to be used to derive the AUTN in the first authentication vector, and a second SQN is to be used to derive the AUTN in the second authentication vector. The first SQN and the second SQN each include a flag bit, and the flag bit of the first SQN is different from the flag bit of the second SQN, or the first SQN and the second SQN belong to different SQN segment intervals.

For another example, the first authentication vector is an authentication vector with 4-tuple parameters ($K_{gba}$, RAND, AUTN, XRES), and the second authentication vector is an authentication vector with 5-tuple parameters (CK, IK, RAND, AUTN, XRES) or the second authentication vector is an authentication vector with 4-tuple parameters ($K_{ausf}$, RAND, AUTN, XRES).

Derivation parameters used to derive the key $K_{gba}$, for example, may include the cipher key CK, the integrity protection key IK, and a parameter $y_2$.

In some possible implementations, that UDM receives a GBA authentication request carrying a user terminal identifier includes: The UDM receives, from a BSF, the GBA authentication request carrying the user terminal identifier, or the UDM receives, from an AUSF, the GBA authentication request carrying the user terminal identifier.

In some possible implementations, that the UDM sends a GBA authentication response carrying the first authentication vector includes: The UDM sends the GBA authentication response carrying the first authentication vector to the AUSF, where the GBA authentication response is used to trigger the AUSF to derive a CK" by using the CK' and to derive an IK" by using the IK', or the GBA authentication response is used to trigger the AUSF to derive a $K_{gba}$' by using the $K_{gba}$, where at least one derivation parameter used to derive the $K_{gba}$' includes the parameter $y_2$.

In some possible implementations, the parameter $y_1$ or the parameter $y_2$ includes one or more of the following parameters: a string 5G GBA, a string GBA, a 5G GBA dedicated identifier, a BSF identifier, a 5G identifier, and a fresh parameter such as a counter, a nonce, or a sequence number.

In some possible implementations, that the communication unit receives a generic bootstrapping architecture (GBA) authentication request carrying a user terminal identifier includes: receiving, from a BSF, the GBA authentication request carrying the user terminal identifier, or receiving, from an AUSF, the GBA authentication request carrying the user terminal identifier.

In some possible implementations, that the communication unit sends a GBA authentication response carrying the first authentication vector includes: sending the GBA authentication response carrying the first authentication vector to the AUSF, where the GBA authentication response is used to trigger the AUSF to derive a CK" by using the CK' and to derive an IK" by using the IK', or the GBA authentication response is used to trigger the AUSF to derive a $K_{gba}$' by using the $K_{gba}$, where at least one derivation parameter used to derive the $K_{gba}$' includes the parameter $y_2$.

In some possible implementations, the parameter $y_1$ or the parameter $y_2$ includes one or more of the following parameters: a string 5G GBA, a string GBA, a 5G GBA dedicated identifier, a BSF identifier, a 5G identifier, and a fresh parameter such as a counter, a nonce, or a sequence number.

According to a third aspect, an embodiment of this application provides a communication authentication method, including: A user terminal sends a generic bootstrapping architecture (GBA) authentication request carrying a user terminal identifier. The user terminal receives an authentication request carrying an AUTN and a RAND. The user terminal derives a first authentication vector based on the AUTN and the RAND, where the first authentication vector is different from a second authentication vector of the user terminal, the first authentication vector is a 5G GBA authentication vector, and the second authentication vector includes a 3G/4G GBA authentication vector and/or a 5G authentication vector.

It may be learned that, the foregoing example solution may implement GBA authentication in a 5G network, thereby helping lay a good foundation for applying a GBA technology to the 5G network. In addition, the foregoing solution facilitates isolation between the 5G GBA authentication vector and another authentication vector of the UE. For example, a cipher key CK' and an integrity protection key IK' in the 5G GBA authentication vector may be isolated from a cipher key CK and an integrity protection key IK in the another authentication vector of the UE. This helps avoid abuse of, for example, the cipher key CK' and the integrity protection key IK'.

The first authentication vector may be an authentication vector with 5-tuple parameters or an authentication vector with 4-tuple parameters, and the second authentication vector may be an authentication vector with 5-tuple parameters or an authentication vector with 4-tuple parameters.

Specifically, for example, the first authentication vector is an authentication vector with 5-tuple parameters (CK', IK', RAND, AUTN, XRES), and the second authentication vector is an authentication vector with 5-tuple parameters (CK, IK, RAND, AUTN, XRES), where the cipher key CK' in the first authentication vector is different from the cipher key CK in the second authentication vector, and/or the integrity protection key IK' in the first authentication vector is different from the integrity protection key IK in the second authentication vector.

It may be understood that, there may be various manners to make the cipher key CK' in the first authentication vector different from the cipher key CK in the second authentication vector. For example, related derivation parameters and/or derivation functions are different. There may be various manners to make the integrity protection key IK' in the first authentication vector different from the integrity protection key IK in the second authentication vector. For example, related derivation parameters and/or derivation functions are different.

For example, parameters used to derive the cipher key CK' include the random number RAND, a root key K, and a derivation parameter $y_1$, and parameters used to derive the integrity protection key IK' include the RAND, the root key K, and a derivation parameter $y_2$, a derivation function $f_3'$ used to derive the CK' is different from a derivation function $f_3$ used to derive the CK, and a derivation function $f_4'$ used to derive the IK' is different from a derivation function $f_4$ used to derive the IK, the CK' and the IK' are derived from the CK, the IK, and an FC value, and the FC value is different from an FC value used to derive the second authentication vector, or a first SQN is to be used to derive the AUTN in the first authentication vector, and a second SQN is to be used to derive the AUTN in the second authentication vector. The first SQN and the second SQN each include a flag bit, and the flag bit of the first SQN is different from the flag bit of the second SQN, or the first SQN and the second SQN belong to different SQN segment intervals.

For another example, the first authentication vector is an authentication vector with 4-tuple parameters ($K_{gba}$, RAND, AUTN, XRES), and the second authentication vector is an authentication vector with 5-tuple parameters (CK, IK, RAND, AUTN, XRES) or the second authentication vector is an authentication vector with 4-tuple parameters ($K_{ausf}$, RAND, AUTN, XRES).

Derivation parameters used to derive the key $K_{gba}$, for example, may include the cipher key CK, the integrity protection key IK, and a parameter $y_2$.

In some possible implementations, the parameter $y_1$ or the parameter $y_2$ includes one or more of the following parameters: a string 5G GBA, a string GBA, a 5G GBA dedicated identifier, a BSF identifier, a 5G identifier, and a fresh parameter such as a counter, a nonce, or a sequence number.

According to a fourth aspect, an embodiment of this application further provides a user terminal, including: a communication unit, configured to: send a generic bootstrapping architecture (GBA) authentication request carrying a user terminal identifier, and receive an authentication request carrying an AUTN and an RAND, and a generation unit, configured to derive a first authentication vector based on the AUTN and the RAND, where the first authentication vector is different from a second authentication vector of the user terminal, the first authentication vector is a 5G GBA authentication vector, and the second authentication vector includes a 3G/4G GBA authentication vector and/or a 5G authentication vector.

The first authentication vector may be an authentication vector with 5-tuple parameters or an authentication vector with 4-tuple parameters, and the second authentication vector may be an authentication vector with 5-tuple parameters or an authentication vector with 4-tuple parameters.

Specifically, for example, the first authentication vector is an authentication vector with 5-tuple parameters (CK', IK', RAND, AUTN, XRES), and the second authentication vector is an authentication vector with 5-tuple parameters (CK, IK, RAND, AUTN, XRES), where the cipher key CK' in the first authentication vector is different from the cipher key CK in the second authentication vector, and/or the integrity protection key IK' in the first authentication vector is different from the integrity protection key IK in the second authentication vector.

It may be understood that, there may be various manners to make the cipher key CK' in the first authentication vector different from the cipher key CK in the second authentication vector. For example, related derivation parameters and/or derivation functions are different. There may be various manners to make the integrity protection key IK' in the first authentication vector different from the integrity protection key IK in the second authentication vector. For example, related derivation parameters and/or derivation functions are different.

For example, parameters used to derive the cipher key CK' include the random number RAND, a root key K, and a derivation parameter $y_1$, and parameters used to derive the integrity protection key IK' include the RAND, the root key K, and a derivation parameter $y_2$, a derivation function $f_3'$ used to derive the CK' is different from a derivation function $f_3$ used to derive the CK, and a derivation function $f_4'$ used to derive the IK' is different from a derivation function $f_4$ used to derive the IK, the CK' and the IK' are derived from the CK, the IK, and an FC value, and the FC value is different from an FC value used to derive the second authentication vector, or a first SQN is to be used to derive the AUTN in the first authentication vector, and a second SQN is to be used to derive the AUTN in the second authentication vector. The first SQN and the second SQN each include a flag bit, and the flag bit of the first SQN is different from the flag bit of the second SQN, or the first SQN and the second SQN belong to different SQN segment intervals.

For another example, the first authentication vector is an authentication vector with 4-tuple parameters ($K_{gba}$, RAND, AUTN, XRES), and the second authentication vector is an authentication vector with 5-tuple parameters (CK, IK, RAND, AUTN, XRES) or the second authentication vector is an authentication vector with 4-tuple parameters ($K_{ausf}$, RAND, AUTN, XRES).

Derivation parameters used to derive the key $K_{gba}$, for example, may include the cipher key CK, the integrity protection key IK, and a parameter $y_2$.

In some possible implementations, the parameter $y_1$ or the parameter $y_2$ includes one or more of the following parameters: a string 5G GBA, a string GBA, a 5G GBA dedicated identifier, a BSF identifier, a 5G identifier, and a fresh parameter such as a counter, a nonce, or a sequence number.

According to a fifth aspect, an embodiment of this application further provides a terminal device, including: a processor and a memory that are coupled to each other, where the processor is configured to invoke a computer program stored in the memory, to perform some or all of the steps of the method in the second aspect.

According to a sixth aspect, an embodiment of this application further provides UDM, including: a processor and a memory that are coupled to each other, where the processor is configured to invoke a computer program stored in the memory, to perform some or all of the steps of the method in the first aspect.

According to a seventh aspect, an embodiment of this application further provides a computer-readable storage medium, where the computer-readable storage medium stores a computer program, and the computer program is performed by a processor, to complete some or all of the steps of the methods in the foregoing aspects.

According to an eighth aspect, an embodiment of this application further provides a computer program product including instructions, where when the computer program product runs on a user terminal, the user terminal is enabled to perform some or all of the steps of any method in the second aspect.

According to a ninth aspect, an embodiment of this application further provides a computer program product including instructions, where when the computer program product runs on UDM, the UDM is enabled to perform some or all of the steps of any method in the first aspect.

According to a tenth aspect, an embodiment of this application further provides a communication apparatus, including at least one input end, a signal processor, and at least one output end, where the signal processor is configured to perform some or all of the steps of any method in the foregoing aspects.

According to an eleventh aspect, an embodiment of this application further provides a communication apparatus, including an input interface circuit, a logic circuit, and an output interface circuit, where the logic circuit is configured to perform some or all of the steps of any method in the first aspect or the second aspect.

BRIEF DESCRIPTION OF THE DRAWINGS

The following describes some accompanying drawings in embodiments of this application.

FIG. 1-A is a schematic diagram of an architecture of a communication system according to an embodiment of this application;

FIG. 1-B to FIG. 1-D are schematic diagrams of structures of some other communication systems according to an embodiment of this application;

FIG. 2 is a schematic flowchart of a communication authentication method according to an embodiment of this application;

FIG. 3-A is a schematic flowchart of another communication authentication method according to an embodiment of this application;

FIG. 3-B to FIG. 3-E are schematic diagrams of derivation of several authentication vectors according to an embodiment of this application;

DETAILED DESCRIPTION OF ILLUSTRATIVE EMBODIMENTS

Figure 4:
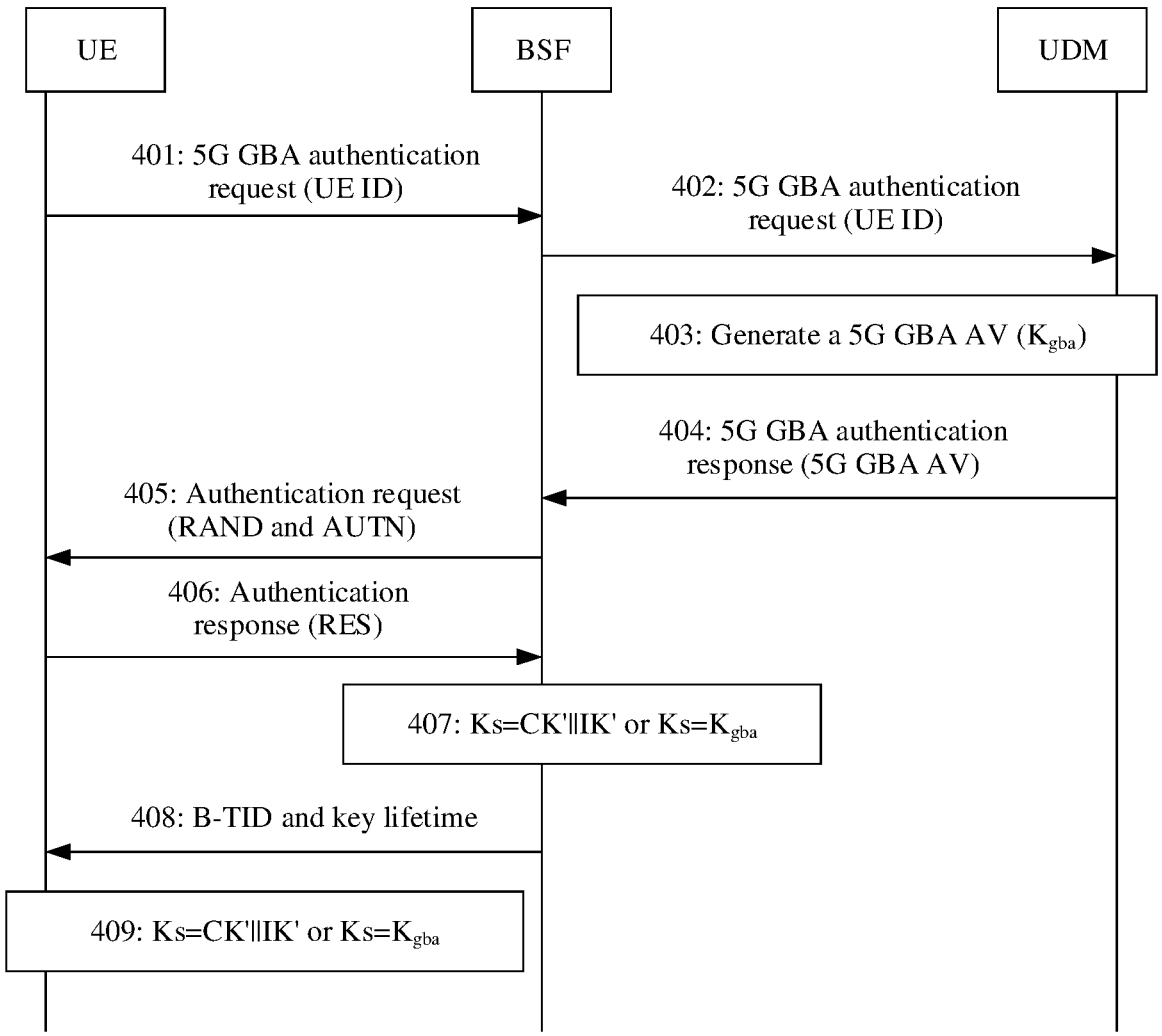
FIG. 4 is a schematic flowchart of another communication authentication method according to an embodiment of this application.

The following describes embodiments of this application with reference to the accompanying drawings in the embodiments of this application.

FIG. 1-A is a schematic diagram of an example of a 5G network architecture according to an embodiment of this application. In a 5G network, some function network elements (for example, a mobility management entity (MME, Mobility Management Entity)) in a 4G network are split, and a service-based architecture is defined. In the network architecture shown in FIG. 1-A, a function similar to that of the MME in the 4G network is split into an access and mobility management function (AMF, Access and Mobility Management Function), a session management function (SMF, Session Management Function), and the like.

The following describes some other related functional entities.

A user equipment (UE) accesses a data network (DN, Data Network) or the like by accessing an operator network, and may use a service provided by an operator or a third party on the DN.

For ease of description, the user terminal, the user equipment, a terminal device, or a terminal in the embodiments of this application may be collectively referred to as UE. In other words, unless otherwise specified, the UE described below in the embodiments of this application may be replaced with the user terminal, the user equipment, the terminal device, or the terminal. Certainly, these terms may also be interchanged.

The access and mobility management function (AMF) is a control plane function in a 3GPP network, and is mainly responsible for access control and mobility management when the UE accesses the operator network. A security anchor function (SEAF, Security Anchor Function) may be deployed in the AMF, or deployed in a device other than the AMF. FIG. 1-A shows an example in which the SEAF is deployed in the AMF. When the SEAF is deployed in the AMF, the SEAF and the AMF may be jointly referred to as an AMF.

The session management function (SMF) is a control plane function in the 3GPP network. The SMF is mainly responsible for managing a packet data packet (PDU, Packet Data Unit) session of the UE. The PDU session is a channel used to transmit a PDU, and the UE and the DN may send the PDU to each other by using the PDU session. The SMF is responsible for management tasks such as establishment, maintenance, and deletion of the PDU session.

The data network (DN, Data Network), also referred to as a packet data network (PDN, Packet Data Network), is a network located outside the 3GPP network. A plurality of DNs may be connected to the 3GPP network, and a plurality of services provided by the operator or the third party may be deployed on the DN. For example, a DN is a private network of a smart factory, a sensor installed in a workshop of the smart factory plays a role of UE, and a control server of the sensor is deployed in the DN. The UE communicates with the control server. After obtaining an instruction from the control server, the UE may transfer collected data to the control server according to the instruction. For another example, a DN is an internal office network of a company, a terminal used by an employee of the company may play a role of UE, and the UE may access internal information and other resources of the company.

A unified data management (UDM, Unified Data Management) entity is also a control plane function in the 3GPP network. The UDM is mainly responsible for storing subscription data, a credential (credential), a subscriber permanent identifier (SUPI, Subscriber Permanent Identifier), and the like of a subscriber (UE) in the 3GPP network. The data may be used for authentication and authorization when the UE accesses the 3GPP network of the operator.

An authentication server function (AUSF) is also a control plane function in the 3GPP network. The AUSF is mainly used for first-level authentication (namely, subscriber authentication in the 3GPP network).

A network exposure function (NEF, Network Exposure Function) is also a control plane function in the 3GPP network. The NEF is mainly responsible for exhibiting an external interface of the 3GPP network to the third party in a secure manner. When a functional entity, for example, the SMF, needs to communicate with a third-party network element, the NEF may serve as a relay for communication. The NEF can translate internal and external identifiers when serving as the relay. For example, when an SUPI of the UE is sent from the 3GPP network to the third party, the NEF may translate the SUPI into an external identity (ID, Identity) corresponding to the SUPI. Conversely, when an external identity ID is sent to the 3GPP network, the NEF may translate the external identity ID into a corresponding SUPI.

A network repository function (NRF, Network Repository Function) is also a control plane function in the 3GPP network, and is mainly responsible for storing a configuration service profile (profile) of an accessible network function (NF), and providing a network function discovery service for another functional entity.

A user plane function (UPF, User Plane Function) is a gateway for communication between the 3GPP network and the DN.

A policy control function (PCF, Policy Control Function) is a control plane function in the 3GPP network, and is configured to provide a policy of a PDU session for the SMF. The policy may include charging, quality of service (QoS, Quality of Service), an authorization-related policy, and the like.

An access network (AN, Access Network) is a subnetwork of the 3GPP network. To access the 3GPP network, the UE needs to first access the AN. In a radio access scenario, the AN is also referred to as a radio access network (RAN, Radio Access Network). Therefore, terms "RAN" and "AN" are usually used interchangeably.

The 3GPP network is a network that complies with 3GPP specifications. In FIG. 1-A, parts other than the UE and the DN may be considered as the 3GPP network. The 3GPP network is not limited to a 5G network defined by the 3GPP, but may further include a 2G network, a 3G network, and a 4G network. Usually, the 3GPP network is operated by the operator. In addition, $N_1$, $N_2$, $N_3$, $N_4$, $N_6$, and the like in the architecture shown in FIG. 1-A represent reference points (Reference Points) between related network entities/network functions. Nausf, Namf, and the like represent service-oriented interfaces of related network functions.

Certainly, the 3GPP network and a non-3GPP network may coexist, and some network elements in the 5G network may also be used in some non-5G networks.

FIG. 1-B to FIG. 1-D are schematic diagrams of examples of some specific network architectures to which a GBA technology may be applied.

A bootstrapping server function (BSF) may interact with UE, and authentication between the UE and the BSF may be performed. There is a Zh interface between the BSF and an HSS. The BSF may obtain a related parameter of UE authentication from the HSS.

For a network application function (NAF, Network Application Function), each application may have one or more NAFs, and the BSF and the UE may interact with a plurality of NAFs.

The BSF may obtain, from a subscriber locator function (SLF, Subscriber Locator Function), HSS names corresponding to the UE (in a scenario of a plurality of HSSs).

The home subscriber system (HSS, Home Subscriber System) may be configured to store subscription information of the UE, and may be further configured to generate an authentication vector, and the like.

GBA security mainly includes two major functions.

Function 1: Perform GBA AKA authentication, where participants in GBA AKA authentication include the UE, the BSF, and the HSS, implement Ks key agreement between the UE and the BSF based on a root key shared between the UE and the HSS, and establish a shared key between the BSF and the UE by performing an authentication process.

Function 2: Perform K_NAF key agreement between the UE and the NAF, where participants in K_NAF key agreement between the UE and the NAF include the UE, the NAF, and the BSF.

In the example of the architecture in FIG. 1-C, there is a direct connection interface between the BSF and UDM. In the example of the architecture in FIG. 1-D, the BSF and the UDM exchange a message through an AUSF.

The following describes some solutions of applying the GBA technology to a 5G network.

FIG. 2 is a schematic flowchart of a communication authentication method according to an embodiment of this application. The communication authentication method shown in FIG. 2 as an example may be specifically implemented based on the network architecture shown in FIG. 1-C or FIG. 1-D as an example. The communication authentication method may specifically include the following steps.

201: UE sends a generic bootstrapping architecture (GBA) authentication request carrying a user terminal identifier to a BSF.

The GBA authentication request may be sent by an AUSF or the BSF. The GBA authentication request has a function of requesting GBA authentication, but a specific message name of the GBA authentication request may be an authentication request, an access request, a registration request, or another message name.

202: A unified data management (UDM) entity receives, from the BSF or the AUSF, the generic bootstrapping architecture (GBA) authentication request carrying the user terminal identifier (where the BSF or the AUSF may forward, from the UE, the generic bootstrapping architecture (GBA) authentication request carrying the user terminal identifier to the UDM).

203: The UDM generates a first authentication vector of a user terminal represented by the user terminal identifier. The first authentication vector is different from a second authentication vector of the user terminal, the first authentication vector is a 5G GBA authentication vector, and the second authentication vector includes one or more of the following authentication vectors: a 3G GBA authentication vector, a 4G GBA authentication vector, or a 5G authentication vector.

204: The UDM sends a GBA authentication response carrying the first authentication vector.

205: The BSF sends an authentication request carrying an AUTN and a RAND to the UE, for example, after receiving, from the UDM, the GBA authentication response carrying the first authentication vector.

206: The user terminal receives the authentication request carrying the AUTN and the RAND, and the user terminal derives the first authentication vector based on the AUTN and the RAND.

It may be learned that, the foregoing example solution may implement GBA authentication in a 5G network, thereby helping lay a good foundation for applying a GBA technology to the 5G network. In addition, in the foregoing solution, the first authentication vector is different from the second authentication vector of the user terminal. This facilitates isolation between the 5G GBA authentication vector and another authentication vector of the UE. For example, a cipher key CK' and an integrity protection key IK' in the 5G GBA authentication vector may be isolated from a cipher key CK and an integrity protection key IK in the another authentication vector of the UE. This helps avoid abuse of, for example, the cipher key CK' and the integrity protection key IK'.

FIG. 3-A is a schematic flowchart of a communication authentication method according to an embodiment of this application. The communication authentication method shown in FIG. 3-A as an example may be specifically implemented based on the network architecture shown in FIG. 1-C as an example. The communication authentication method may specifically include the following steps.

301: UE sends a 5G GBA authentication request carrying a UE ID to a BSF.

The 5G GBA authentication request is an authentication request used to request 5G GBA authentication, and a specific message name may be a registration request, an access request, or another message. The UE ID herein may be a permanent identifier, a temporary identifier, or an encapsulation identifier of the UE. A specific UE ID is not limited.

302: After the BSF receives, from the UE, the 5G GBA authentication request carrying the UE ID, the BSF sends the 5G GBA authentication request carrying the UE ID to UDM.

Optionally, herein, the BSF may determine information about the UDM based on the UE ID, for example, routing information of the UDM.

Optionally, the BSF sends an authentication type indication to the UDM by using the 5G GBA authentication request, where the authentication type indication may be used to indicate that the authentication request is an authentication request used for 5G GBA authentication.

Optionally, the BSF may alternatively indicate, to the UDM by sending a dedicated authentication request message name or type, that the authentication request is an authentication request for 5G GBA authentication, for example, by using a dedicated service-oriented message name or type.

Optionally, the BSF sends a BSF identifier to the UDM, for example, information that identifies the BSF, such as a name, an IP, an instance ID, or other address information of the BSF.

303: The UDM receives, from the BSF, the 5G GBA authentication request carrying the UE ID.

Optionally, the UDM may determine, based on the authentication type indication carried in the 5G GBA authentication request, that the authentication request is a 5G GBA authentication request.

Optionally, the UDM may determine, based on the dedicated authentication request message name or type, that the authentication request is a 5G GBA authentication request.

Optionally, the UDM receives identification information of the BSF, or the UDM may determine identification information of the BSF based on link information of the UDM and the BSF.

Optionally, the UDM determines whether subscription data corresponding to the UE ID allows the UE corresponding to the UE ID to use a 5G GBA service. If the subscription data does not allow the UE corresponding to the UE ID to use the 5G GBA service, the UDM may reject the 5G GBA authentication request. Optionally, a manner in which the UDM may reject the 5G GBA authentication request may be sending a rejection indication to the UE, to indicate that the UE is not authorized to use the 5G GBA service. If the subscription data allows the UE corresponding to the UE ID to use the 5G GBA service, the UDM may continue a 5G GBA authentication procedure.

Certainly, the UDM may also determine by default that the subscription data corresponding to the UE ID allows the UE corresponding to the UE ID to use the 5G GBA service. In this case, the UDM may not need to perform a step of determining whether the subscription data corresponding to the UE ID allows the UE corresponding to the UE ID to use the 5G GBA service.

The UDM generates a 5G GBA authentication vector (CK', IK', RAND, AUTN, XRES).

A manner of generating the CK' and the IK' may ensure isolation of the CK' and the IK', in other words, ensure that the CK' and the IK' are bound up with the 5G GBA service.

The manner of generating the CK' and the IK' may be the following example manner.

Refer to FIG. 3-B. When the CK' and the IK' are derived based on a root key K and the RAND, a new derivation parameter $y_1$ and a new derivation parameter $y_2$ may be introduced for derivation of the CK' and the IK' respectively. To be specific, parameters used to derive the CK' include the RAND, the root key K, and the derivation parameter $y_1$ (parameters used to derive a CK include the RAND and the root key K, but do not include the derivation parameter $y_1$). Parameters used to derive the IK' include the RAND, the root key K, and the derivation parameter $y_2$ (parameters used to derive an IK include the RAND and the root key K, but do not include the derivation parameter $y_2$).

The derivation parameter $y_1$ and the derivation parameter $y_2$, for example, may each be a string "5G GBA", a string "GBA", a 5G GBA dedicated identifier, a BSF identifier, a 5G identifier, slice selection assistance information, a slice ID, a PDU session ID, a UE identifier (permanent identifier or temporary identifier), or a fresh parameter such as a counter, a nonce, or a sequence number. Herein, the slice selection assistance information or the slice ID may be sent by the BSF to the UDM, or determined by the UDM based on local information. The PDU session ID is sent by the BSF to the UDM, or is determined by the UDM based on the local information. It may be understood that, herein, the slice selection assistance information, the slice ID, or the PDU session ID is slice information or session information related to a communication link between the BSF and the UE, and is used to restrict a key to be used only for the link.

For all embodiments of this application, if the UE does not store or cannot deduce the fresh parameter such as the counter, the nonce, or the sequence number used in the derivation, a network element (for example, the UDM, an AUSF, or the BSF) in a network may transfer the parameter to the UE.

Refer to FIG. 3-C. A new derivation function $f_3'$ and a new derivation function $f_4'$ may be further introduced, where the cipher key CK' may be derived by using the derivation function $f_3'$, and the integrity protection key IK' may be derived by using the derivation function $f_4'$. The derivation function $f_3'$ is different from a derivation function $f_3$ for deriving the CK, and the derivation function $f_4'$ is different from a derivation function $f_4$ for deriving the IK. Other derivation parameters may further include the $y_1$ and/or the $y_2$.

Refer to FIG. 3-D. Derivation may be continued based on the CK and the IK, to obtain the CK' and the IK'. For example, the cipher key CK' may be derived by using the cipher key CK and the derivation parameter $y_1$, and the integrity protection key IK' may be derived by using the integrity protection key IK and the derivation parameter $y_1$.

Alternatively, the CK' and the IK' are generated based on a new FC value. Specifically, for example, the CK' and the IK' are generated based on the new FC value, the CK, and the IK, and another parameter may further include the $y_1$.

Alternatively, the CK' and the IK' are derived by using an HN name because the BSF also belongs to a home network.

For another example, a first SQN is to be used to derive the AUTN in the 5G GBA authentication vector, and a second SQN is to be used to derive an AUTN in a 5G authentication vector or a GBA authentication vector. The first SQN and the second SQN each include a flag bit (where a flag bit is, for example, one most significant bit or a plurality of most significant bits of an SQN), and the flag bit of the first SQN is different from the flag bit of the second SQN (where different flag bits may be used to distinguish between 5G authentication and 5G GBA authentication). Alternatively, SQNs may be divided by using an SQN segmentation manner. Specifically, for example, if SQNs are valued from 1 to 100, the first 50 SQNs are used as first SQNs, and the last 50 SQNs are second SQNs.

The CK' and the IK' are derived from the CK, the IK, and an FC value, and the FC value is different from an FC value used to derive the 5G authentication vector.

Optionally, if derivation parameters except the FC value are the same as derivation keys in the conventional technology, the FC value in this patent should be a new value, in other words, different from an FC value used in the conventional technology.

Generally, the foregoing example manner aims to make the CK' in the 5G GBA authentication vector different from a CK in a 3G GBA/4G GBA/5G authentication vector, and make the IK' in the 5G GBA authentication vector different from an IK in the 3G GBA/4G GBA/5G authentication vector. Other manners that can implement this objective can also be considered for use.

304: The UDM sends a 5G GBA authentication response carrying the 5G GBA authentication vector to the BSF.

305: The BSF sends an authentication request carrying the RAND and the AUTN to the UE.

306: The UE verifies the AUTN, and calculates an RES after the AUTN is successfully verified, and the UE sends an authentication response carrying the RES to the BSF.

307: The BSF receives the authentication response from the UE, verifies whether the XRES is the same as the RES carried in the authentication response, and generates Ks=CK'||IK' if the XRES is the same as the RES.

308: The BSF sends a B-TID and a key lifetime. The B-TID is a temporary identifier allocated by the BSF to the UE, and the key lifetime represents a validity period of Ks.

309: The UE generates Ks, where Ks=CK'||IK'. A method for generating the CK' and the IK' by the UE is the same as a method for generating the CK' and the IK' by the UDM.

It may be understood that a step of generating the CK' and the IK' by the UE may be performed at any moment after step 306. A step of generating the CK' and the IK' by the BSF may be performed at any moment after step 306. A step of calculating another parameter, for example, the XRES, other than the CK' and the IK', is also performed at any time before the parameter needs to be used.

It may be learned that, in the solution exemplified in this embodiment, the CK' and the IK' in the 5G GBA authentication vector are isolated from the CK and the IK in another authentication vector of the UE, and this helps avoid abuse of the CK' and the IK'. In addition, the BSF still receives a 5G GBA authentication vector with 5-tuple parameters. The BSF may reuse operations in an old product.

FIG. 4 is a schematic flowchart of a communication authentication method according to an embodiment of this application. The communication authentication method shown in FIG. 4 as an example may be specifically implemented based on the network architecture shown in FIG. 1-C as an example. The communication authentication method may specifically include the following steps.

401: UE sends a 5G GBA authentication request carrying a UE ID to a BSF.

The 5G GBA authentication request is an authentication request used to request 5G GBA authentication, and a specific message name may be a registration request, an access request, or another message. The UE ID herein may be a permanent identifier, a temporary identifier, or an encapsulation identifier of the UE. This is not limited.

402: After the BSF receives, from the UE, the 5G GBA authentication request carrying the UE ID, the BSF sends the 5G GBA authentication request carrying the UE ID to UDM.

Optionally, herein, the BSF may determine information about the UDM based on the UE ID.

Optionally, the BSF sends an authentication type indication to the UDM by using the 5G GBA authentication request, where the authentication type indication may be used to indicate that the authentication request is an authentication request used for 5G GBA authentication.

Optionally, the BSF may alternatively indicate the UDM by sending a dedicated authentication request message name or type, to indicate that the authentication request is an authentication request for 5G GBA authentication, for example, by using a dedicated service-oriented message name or type.

Optionally, the BSF sends a BSF identifier to the UDM. For example, the BSF identifier is information that identifies the BSF, such as a name, an IP, an instance ID, or other address information of the BSF.

403: The UDM receives, from the BSF, the 5G GBA authentication request carrying the UE ID.

Optionally, the UDM may determine, based on the authentication type indication carried in the 5G GBA authentication request, that the authentication request is a 5G GBA authentication request.

Optionally, the UDM may determine, based on the dedicated authentication request message name or type, that the authentication request is a 5G GBA authentication request.

Optionally, the UDM receives identification information of the BSF, or the UDM may determine identification information of the BSF based on link information of the UDM and the BSF.

Optionally, the UDM determines whether subscription data corresponding to the UE ID allows the UE corresponding to the UE ID to use a 5G GBA service. If the subscription data does not allow the UE corresponding to the UE ID to use the 5G GBA service, the UDM may reject the 5G GBA authentication request. Optionally, a manner in which the UDM rejects the 5G GBA authentication request may be, for example, sending a rejection indication to the UE, to indicate that the UE is not authorized to use the 5G GBA service. If the subscription data allows the UE corresponding to the UE ID to use the 5G GBA service, the UDM may continue a 5G GBA authentication procedure.

Certainly, the UDM may also determine by default that the subscription data corresponding to the UE ID allows the UE corresponding to the UE ID to use the 5G GBA service. In this case, the UDM may not need to perform a step of determining whether the subscription data corresponding to the UE ID allows the UE corresponding to the UE ID to use the 5G GBA service.

The UDM generates a 5G GBA authentication vector ($K_{gba}$, RAND, AUTN, XRES).

The $K_{gba}$ is derived based on a CK and an IK (refer to the example in FIG. 3-E), or the $K_{gba}$ is a concatenation of a CK' and an IK' or is derived based on the CK' and the IK'.

A manner of generating the CK' and the IK' should ensure isolation of the CK' and the IK', in other words, ensure that the CK' and the IK' are bound up with the 5G GBA service.

For a manner of generating the CK' and the IK', refer to the derivation method, of the CK' and the IK', described in the example in the embodiment corresponding to FIG. 3-A.

A manner of generating the $K_{gba}$ may further be: generating the $K_{gba}$ based on the CK, the IK, and a parameter $y_1$, or generating the $K_{gba}$ based on the CK', the IK', and a parameter $y_1$. In addition, in addition to deriving the $K_{gba}$ from the CK and the IK, or from the CK' and the IK', other parameters or possibilities may further be included.

Refer to FIG. 3-E. A new derivation function f8 may be further introduced, and the $K_{gba}$ may be derived by using the derivation function f8.

Alternatively, the $K_{gba}$ may be generated based on a new FC value. Specifically, for example, the $K_{gba}$ is generated based on the new FC value, the CK, the IK, and the like, and another derivation parameter may further include the $y_1$.

Alternatively, the $K_{gba}$ is derived by using an HN name because the BSF also belongs to a home network.

For another example, a first SQN is to be used to derive an AUTN in the 5G GBA authentication vector, and a second SQN is to be used to derive an AUTN in a 5G authentication vector or a GBA authentication vector. The first SQN and the second SQN each include a flag bit (where a flag bit is, for example, one most significant bit or a plurality of most significant bits of an SQN), and the flag bit of the first SQN is different from the flag bit of the second SQN (where different flag bits may be used to distinguish between 5G authentication and 5G GBA authentication). Alternatively, SQNs may be divided by using an SQN segmentation manner. For example, if SQNs are valued from 1 to 100, the first 50 SQNs are used as first SQNs, and the last 50 SQNs are second SQNs.

The $K_{gba}$ is derived from the CK, the IK, and an FC value, and the FC value is different from an FC value used to derive the 5G authentication vector.

Generally, the foregoing example manner aims to make the Kg. or the CK' and the IK' in the 5G GBA authentication vector different from a key in a 3G GBA/4G GBA/4G authentication vector/5G authentication vector. Other manners that can implement this objective can also be considered for use.

Optionally, if derivation parameters except the FC value are the same as derivation keys in the conventional technology, the FC value in this patent should be a new value, in other words, different from an FC value used in the conventional technology.

404: The UDM sends a 5G GBA authentication response carrying the 5G GBA authentication vector ($K_{gba}$, RAND, AUTN, XRES) to the BSF.

405: The BSF sends an authentication request carrying the RAND and the AUTN to the UE.

406: The UE verifies the AUTN, and calculates an RES after the AUTN is successfully verified, and the UE sends an authentication response carrying the RES to the BSF.

407: The BSF receives the authentication response from the UE, verifies whether the XRES is the same as the RES carried in the authentication response, and generates Ks=CK'||K' if the XRES is the same as the RES.

408: The BSF sends a B-TID and a key lifetime. The B-TID is a temporary identifier allocated by the BSF to the UE, and the key lifetime represents a validity period of Ks.

409: The UE generates Ks, where Ks=CK'||IK'. A method for generating the CK' and the IK' by the UE is the same as a method for generating the CK' and the IK' by the UDM.

It may be understood that a step of generating the CK' and the IK' by the UE may be performed at any moment after step 406. A step of generating the CK' and the IK' by the BSF may be performed at any moment after step 406. A step of calculating another parameter, for example, the XRES, other than the CK' and the IK', is also performed at any time before the parameter needs to be used.

Optionally, the UDM sends an algorithm indication or an identifier to the BSF, to notify the BSF whether a 5G GBA selects an EAP AKA' authentication algorithm or a 5G AKA authentication algorithm. This is because EAP AKA' and 5G AKA use different manners to calculate the CK and the IK. The BSF sends an algorithm indication or an identifier to the UE, to notify the UE whether the 5G GBA selects EAP AKA' or 5G AKA.

It may be learned that, in the solution exemplified in this embodiment, the CK' and the IK' in the 5G GBA authentication vector are isolated from the CK and the IK in another authentication vector of the UE, and this helps avoid abuse of the CK' and the IK'.

Figure 5:
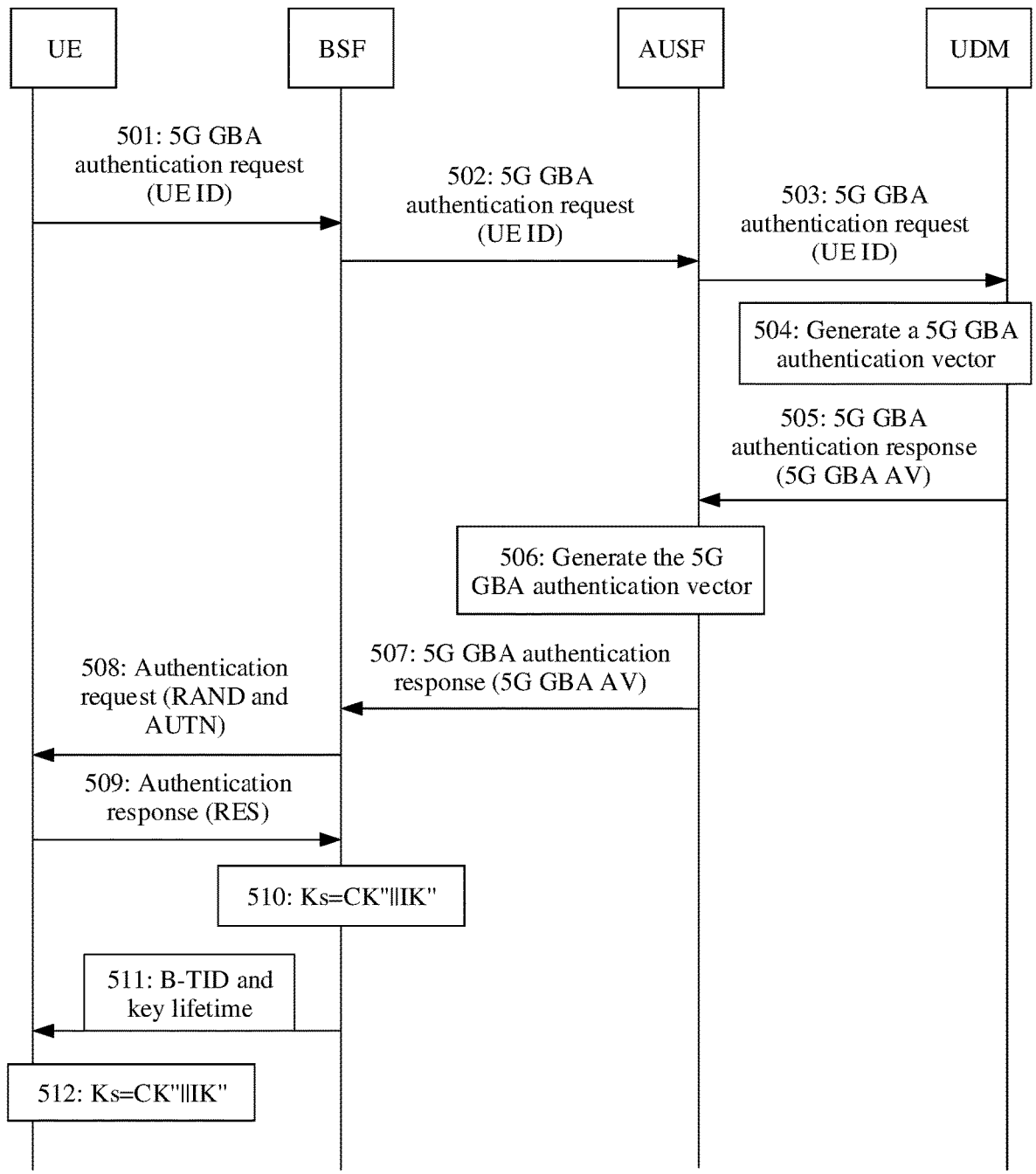
FIG. 5 is a schematic flowchart of another communication authentication method according to an embodiment of this application.

FIG. 5 is a schematic flowchart of a communication authentication method according to an embodiment of this application. The communication authentication method shown in FIG. 5 as an example may be specifically implemented based on the network architecture shown in FIG. 1-D as an example. The communication authentication method may specifically include the following steps.

501: UE sends a 5G GBA authentication request carrying a UE ID to a BSF.

The 5G GBA authentication request is an authentication request used to request 5G GBA authentication, and a specific message name may be a registration request, an access request, or another message. The UE ID herein may be a permanent identifier, a temporary identifier, or an encapsulation identifier of the UE. This is not limited.

502: After the BSF receives, from the UE, the 5G GBA authentication request carrying the UE ID, the BSF sends the 5G GBA authentication request carrying the UE ID to an AUSF.

Optionally, herein, the BSF may determine information about the AUSF based on the UE ID.

Optionally, the BSF sends an authentication type indication to the AUSF by using the 5G GBA authentication request, where the authentication type indication may be used to indicate that the authentication request is an authentication request used for 5G GBA authentication.

Optionally, the BSF may alternatively indicate the AUSF by sending a dedicated authentication request message name or type, to indicate that the authentication request is an authentication request for 5G GBA authentication, for example, by using a dedicated service-oriented message name or type.

Optionally, the BSF sends a BSF identifier to the AUSF, for example, information that identifies the BSF, such as a name, an IP, an instance ID, or other address information of the BSF.

503: The AUSF receives, from the BSF, the 5G GBA authentication request carrying the UE ID. The AUSF sends the 5G GBA authentication request carrying the UE ID to UDM.

Optionally, the AUSF may determine, based on the authentication type indication carried in the 5G GBA authentication request, that the authentication request is a 5G GBA authentication request.

Optionally, the AUSF may determine, based on the dedicated authentication request message name or type, that the authentication request is a 5G GBA authentication request.

Optionally, the AUSF receives identification information of the BSF, or the AUSF may determine identification information of the BSF based on link information of the AUSF and the BSF.

Optionally, the AUSF sends an authentication type indication to the UDM by using the 5G GBA authentication request, where the authentication type indication may be used to indicate that the authentication request is an authentication request used for 5G GBA authentication.

Optionally, the AUSF may alternatively indicate the UDM by sending a dedicated authentication request message name or type, to indicate that the authentication request is an authentication request for 5G GBA authentication, for example, by using a dedicated service-oriented message name or type.

Optionally, the AUSF sends the identification information of the BSF to the UDM.

504: The UDM receives, from the AUSF, the 5G GBA authentication request carrying the UE ID.

Optionally, the UDM may determine, based on the authentication type indication carried in the 5G GBA authentication request, that the authentication request is a 5G GBA authentication request.

Optionally, the UDM may determine, based on the dedicated authentication request message name or type, that the authentication request is a 5G GBA authentication request.

Optionally, the UDM determines whether subscription data corresponding to the UE ID allows the UE corresponding to the UE ID to use a 5G GBA service. If the subscription data does not allow the UE corresponding to the UE ID to use the 5G GBA service, the UDM may reject the 5G GBA authentication request. Optionally, if the subscription data does not allow the UE corresponding to the UE ID to use the 5G GBA service, the UDM sends a rejection message to the UE, where the message may carry a rejection indication. If the subscription data allows the UE corresponding to the UE ID to use the 5G GBA service, the UDM may continue a 5G GBA authentication procedure.

Certainly, the UDM may also determine by default that the subscription data corresponding to the UE ID allows the UE corresponding to the UE ID to use the 5G GBA service. In this case, the UDM may not need to perform a step of determining whether the subscription data corresponding to the UE ID allows the UE corresponding to the UE ID to use the 5G GBA service.

The UDM generates a 5G GBA authentication vector. The 5G GBA authentication vector is, for example, (CK', IK', RAND, AUTN, XRES) or ($K_{gba}1$, RAND, AUTN, XRES).

A manner of generating the CK' and the IK' may ensure isolation of the CK' and the IK', in other words, ensure that the CK' and the IK' are bound up with the 5G GBA service. A manner of generating the $K_{gba}1$ may ensure isolation of the $K_{gba}1$, in other words, ensure that the $K_{gba}1$ is bound up with the 5G GBA service.

For a manner of generating the CK' and the IK', refer to the embodiment corresponding to FIG. 3-A.

For a manner of generating the $K_{gba}1$, refer to a manner of generating the $K_{gba}$ in the embodiment corresponding to FIG. 4.

505: The UDM sends a 5G GBA authentication response carrying the 5G GBA authentication vector to the AUSF.

506: After the AUSF receives, from the UDM, the 5G GBA authentication response carrying the 5G GBA authentication vector, the AUSF further calculates a 5G GBA authentication vector (CK", IK", RAND, AUTN, XRES) or ($K_{gba}b2$, RAND, AUTN, XRES).

The CK" and the IK" are derived based on the CK' and the IK'.

Alternatively, the $K_{gba}2$ is derived based on the $K_{gba}1$.

Alternatively, the $K_{gba}2$ is derived based on the CK' and the IK'.

Alternatively, the CK" and the IK" are derived based on the $K_{gba}1$.

The foregoing derivation manner is not limited.

The foregoing derivation parameters include a new FC value and/or at least one of a parameter $y_1$.

507: The AUSF sends a 5G GBA authentication response carrying the 5G GBA authentication vector (CK", IK", RAND, AUTN, XRES) or ($K_{gba}b2$, RAND, AUTN, XRES) to the BSF.

Alternatively, the AUSF sends a 5G GBA authentication response carrying a 5G GBA authentication vector (RAND, AUTN) to the BSF.

508: The BSF sends an authentication request carrying the RAND and the AUTN to the UE.

509: The UE verifies the AUTN, and calculates an RES after the AUTN is successfully verified, and the UE sends an authentication response carrying the RES to the BSF.

510: The BSF receives the authentication response from the UE, verifies whether the XRES is the same as the RES carried in the authentication response, and generates Ks=CK"∥IK" if the XRES is the same as the RES.

Alternatively, in a solution, if the BSF receives only the RAND and the AUTN, the BSF sends the RES to the AUSF. After verifying that the XRES is the same as the RES, the AUSF sends the CK" and IK" or the $K_{gba}2$ to the BSF.

511: The BSF sends a B-TID and a key lifetime. The B-TID is a temporary identifier allocated by the BSF to the UE, and the key lifetime represents a validity period of Ks.

512: The UE generates Ks=CK"∥IK" or Ks=$K_{gba}2$. A method in which the UE generates the CK" and IK" or the $K_{gba}2$ is the same as a method in which the UDM and the AUSF together generate the CK" and IK" or the $K_{gba}2$.

It may be understood that a step of generating the CK" and IK" or the $K_{gba}2$ by the UE may be performed at any moment after step 506. A step of generating Ks by the BSF may be performed at any moment after step 506. A step of calculating another parameter, for example, the XRES, other than the CK' and the IK', is also performed at any time before the parameter needs to be used.

Optionally, the UDM sends an authentication algorithm identifier to the AUSF in step 505. The AUSF then sends the authentication algorithm identifier to the BSF in step 507. The BSF sends the authentication algorithm identifier to the UE in step 508, so that the UE determines an authentication algorithm used for authentication.

Optionally, the AUSF determines an authentication algorithm based on the parameter received from the UDM in step 505. The AUSF sends the authentication algorithm identifier to the BSF in step 507. The BSF sends the authentication algorithm identifier to the UE in step 508, so that the UE determines an authentication algorithm used for authentication.

It may be learned that, in the solution exemplified in this embodiment, the CK" and IK" or the $K_{gba}2$ in the 5G GBA authentication vector are/is isolated from a CK and an IK or another key (for example, a 4G authentication key K. or a 5G authentication key $K_{ausf}$) in another authentication vector of the UE, and this helps avoid abuse of the CK" and IK" or the $K_{gba}2$.

For all the foregoing embodiments, specific details of the verification and authentication of the UE, the BSF, and the AUSF are not limited.

The following further provides some device embodiments. Functions of devices described in these device embodiments may be specifically implemented based on the method in the method embodiments.

Figure 6:
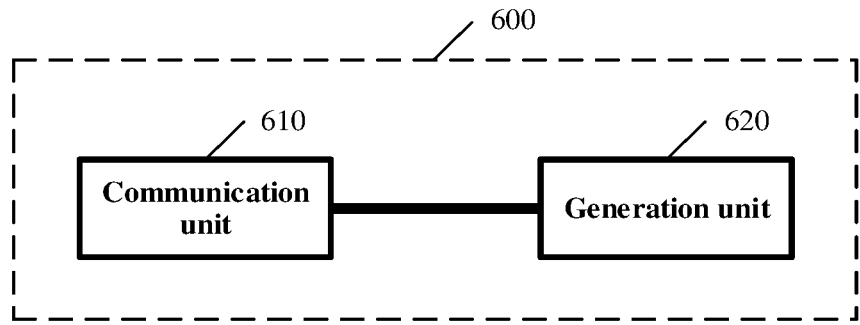
FIG. 6 is a schematic diagram of a structure of UDM according to an embodiment of this application.

Refer to FIG. 6. An embodiment of this application provides a unified data management entity 600, including a communication unit 610, configured to receive a generic bootstrapping architecture (GBA) authentication request (which may be sent by an AUSF or a BSF) carrying a user terminal identifier, and a generation unit 620, configured to generate a first authentication vector of a user terminal represented by the user terminal identifier, where the first authentication vector is different from a second authentication vector of the user terminal, the first authentication vector is a 5G GBA authentication vector, and the second authentication vector includes a 3G/4G GBA authentication vector and/or a 5G authentication vector.

The communication unit 610 is further configured to send a GBA authentication response carrying the first authentication vector.

It may be learned that, the foregoing solution may implement GBA authentication in a 5G network, thereby laying a good foundation for applying a GBA technology to the 5G network. In addition, in the foregoing solution, the CK' and the IK' in the 5G GBA authentication vector are isolated from the CK and the IK in the another authentication vector of the UE, and this helps avoid abuse of the CK' and the IK'.

The first authentication vector may be an authentication vector with 5-tuple parameters or an authentication vector with 4-tuple parameters, and the second authentication vector may be an authentication vector with 5-tuple parameters or an authentication vector with 4-tuple parameters.

Specifically, for example, the first authentication vector is an authentication vector with 5-tuple parameters (CK', IK', RAND, AUTN, XRES). The second authentication vector is an authentication vector with 5-tuple parameters (CK, IK, RAND, AUTN, XRES), where the CK' is different from the CK, and/or the IK' is different from the IK.

For example, parameters used to derive the cipher key CK' include the RAND, a root key K, and a derivation parameter $y_1$, and parameters used to derive the integrity protection key IK' include the RAND, the root key K, and a derivation parameter $y_2$, a derivation function $f_3'$ used to derive the CK' is different from a derivation function $f_3$ used to derive the CK, and a derivation function $f_4'$ used to derive the IK' is different from a derivation function $f_4$ used to derive the IK, the CK' and the IK' are derived from the CK, the IK, and an FC value, and the FC value is different from an FC value used to derive the second authentication vector, or a first SQN is to be used to derive the AUTN in the first authentication vector, and a second SQN is to be used to derive the AUTN in the second authentication vector, where the first SQN and the second SQN each include a flag bit, and the flag bit of the first SQN is different from the flag bit of the second SQN.

For another example, the first authentication vector is an authentication vector with 4-tuple parameters ($K_{gba}$, RAND, AUTN, XRES), and the second authentication vector is an authentication vector with 5-tuple parameters (CK, IK, RAND, AUTN, XRES) or an authentication vector with 4-tuple parameters ($K_{ausf}$, RAND, AUTN, XRES).

Parameters used to derive the $K_{gba}$ include the CK, the IK, and a parameter $y_2$.

In some possible implementations, that the communication unit receives a generic bootstrapping architecture (GBA) authentication request carrying a user terminal identifier includes: receiving, from a BSF, the generic bootstrapping architecture (GBA) authentication request carrying the user terminal identifier, or receiving, from an AUSF, the generic bootstrapping architecture (GBA) authentication request carrying the user terminal identifier.

In some possible implementations, that the communication unit sends a GBA authentication response carrying the first authentication vector includes: sending the GBA authentication response carrying the first authentication vector to the AUSF, where the GBA authentication response is used to trigger the AUSF to derive a CK" by using the CK' and to derive an IK" by using the IK', or the GBA authentication response is used to trigger the AUSF to derive a $K_{gba}'$ by using the $K_{gba}$, where at least one derivation parameter used to derive the $K_{gba}'$ includes the parameter $y_2$.

In some possible implementations, the parameter $y_1$ or the parameter $y_2$ includes one or more of the following parameters: a string 5G GBA, a string GBA, a 5G GBA dedicated identifier, a BSF identifier, a 5G identifier, and a fresh parameter such as a counter, a nonce, or a sequence number.

Figure 7:
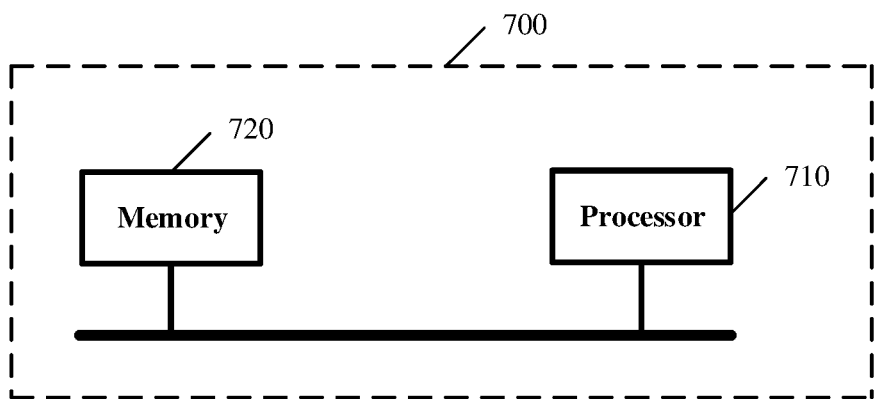
FIG. 7 is a schematic diagram of a structure of other UDM according to an embodiment of this application.

Refer to FIG. 7. A terminal device 700 may include a processor 710 and a memory 720 that are coupled to each other. The processor is configured to invoke a computer program stored in the memory, to perform some or all steps of any method performed by the terminal device in the embodiments of this application.

Figure 8:
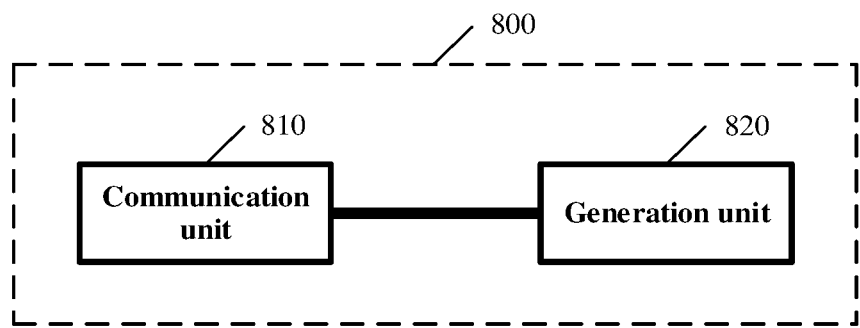
FIG. 8 is a schematic diagram of a structure of a user terminal according to an embodiment of this application.

Refer to FIG. 8. An embodiment of this application further provides a user terminal 800, including: a communication unit 810, configured to: send a generic bootstrapping architecture (GBA) authentication request carrying a user terminal identifier, and receive an authentication request carrying an AUTN and an RAND, and a generation unit 820, configured to derive a first authentication vector based on the AUTN and the RAND, where the first authentication vector is different from a second authentication vector of the user terminal, the first authentication vector is a 5G GBA authentication vector, and the second authentication vector includes a 3G/4G GBA authentication vector and/or a 5G authentication vector.

It may be learned that, the foregoing solution may implement GBA authentication in a 5G network, thereby laying a good foundation for applying a GBA technology to the 5G network. In addition, in the foregoing solution, a CK' and an IK' in the 5G GBA authentication vector are isolated from a CK and an IK in another authentication vector of the UE, and this helps avoid abuse of the CK' and the IK'.

The first authentication vector may be an authentication vector with 5-tuple parameters or an authentication vector with 4-tuple parameters, and the second authentication vector may be an authentication vector with 5-tuple parameters or an authentication vector with 4-tuple parameters.

Specifically, for example, the first authentication vector is an authentication vector with 5-tuple parameters (CK', IK', RAND, AUTN, XRES). The second authentication vector is an authentication vector with 5-tuple parameters (CK, IK, RAND, AUTN, XRES), where the CK' is different from the CK, and/or the IK' is different from the IK.

For example, parameters used to derive the cipher key CK' include the RAND, a root key K, and a derivation parameter $y_1$, and parameters used to derive the integrity protection key IK' include the RAND, the root key K, and a derivation parameter $y_2$, a derivation function $f_3'$ used to derive the CK' is different from a derivation function $f_3$ used to derive the CK, and a derivation function $f_4'$ used to derive the IK' is different from a derivation function $f_4$ used to derive the IK, the CK' and the IK' are derived from the CK, the IK, and an FC value, and the FC value is different from an FC value used to derive the second authentication vector, or a first SQN is to be used to derive the AUTN in the first authentication vector, and a second SQN is to be used to derive the AUTN in the second authentication vector, where the first SQN and the second SQN each include a flag bit, and the flag bit of the first SQN is different from the flag bit of the second SQN.

For another example, the first authentication vector is an authentication vector with 4-tuple parameters ($K_{gba}$, RAND, AUTN, XRES), and the second authentication vector is an authentication vector with 5-tuple parameters (CK, IK, RAND, AUTN, XRES) or an authentication vector with 4-tuple parameters ($K_{ausf}$, RAND, AUTN, XRES).

Parameters used to derive the $K_{gba}$ include the CK, the IK, and a parameter $y_2$.

In some possible implementations, the parameter $y_1$ or the parameter $y_2$ includes one or more of the following parameters: a string 5G GBA, a string GBA, a 5G GBA dedicated identifier, a BSF identifier, a 5G identifier, a counter, a nonce, or a sequence number.

Figure 9:
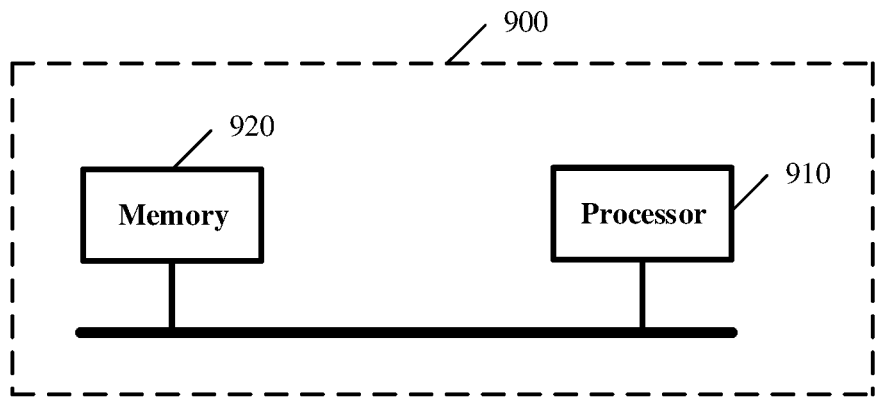
FIG. 9 is a schematic diagram of a structure of another user terminal according to an embodiment of this application.

Refer to FIG. 9. An embodiment of this application further provides UDM goo that may include: a processor 910 and a memory 920 that are coupled to each other.

The processor is configured to invoke a computer program stored in the memory, to perform some or all steps of any method performed by the UDM in the embodiments of this application.

Figure 10:
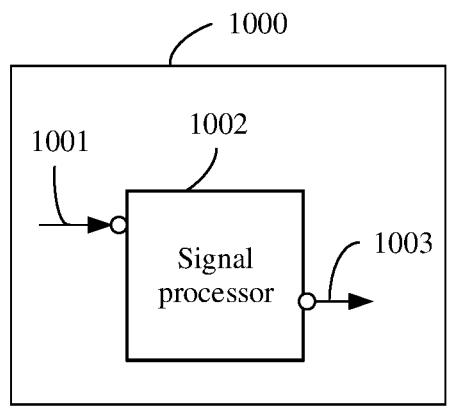
FIG. 10 is a schematic diagram of a structure of a communication apparatus according to an embodiment of this application.

FIG. 10 is a schematic diagram of a structure of a communication apparatus 1000 according to this application. The communication apparatus 1000 is, for example, a terminal device or UDM. The communication apparatus 1000 may include: at least one input end 1001, a signal processor 1002, and at least one output end 1003.

The at least one input end 1001 is configured to input a signal.

The at least one output end 1003 is configured to output a signal.

The signal processor 1002 is configured to perform some or all steps of any method provided in the embodiments of this application.

Figure 11:
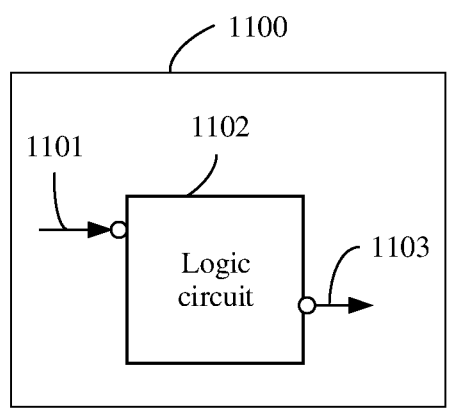
FIG. 11 is a schematic diagram of a structure of another communication apparatus according to an embodiment of this application.

FIG. 11 is a schematic diagram of a structure of a communication apparatus 1100 according to this application. The communication apparatus 1100 is, for example, a terminal device or UDM. The communication apparatus 1100 may include: an input interface circuit 1001, a logic circuit 1002, and an output interface circuit 1003. The at least one input end wool is configured to input a signal. The at least one output end 1003 is configured to output a signal. The logic circuit 1002 is configured to perform some or all steps of any method provided in the embodiments of this application.

An embodiment of this application further provides a computer-readable storage medium. The computer-readable storage medium stores a computer program, the computer program is executed by hardware (for example, a processor) by using some or all steps of any method performed by any device in the embodiments of this application.

An embodiment of this application further provides a computer program product including instructions. When the computer program product runs on a computer device, the computer device is enabled to perform some or all of the steps of any method in the foregoing aspects.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive), or the like.

In the foregoing embodiments, descriptions of the embodiments have respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, the unit division is merely logical function division or may be other division during actual implementation. For example, a plurality of units or components may be combined or integrated into another system, or some features may be ignored or not performed. In addition, the displayed or discussed mutual indirect couplings or direct couplings or communication connections may be implemented through some interfaces. The indirect couplings or communication connections between the apparatuses or units may be implemented in electronic or other forms.

The units described as separate parts may or may not be physically separate. Parts displayed as units may or may not be physical units, and may be located at one position or may be distributed on a plurality of network units. Some or all units may be selected based on actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A communication authentication method, comprising:
sending, by a user terminal, a generic bootstrapping architecture (GBA) authentication request carrying a user terminal identifier;
receiving, by the user terminal, an authentication request carrying an authentication token (AUTN) and a random number (RAND); and
deriving, by the user terminal, a first authentication vector based on the AUTN and the RAND, wherein the first authentication vector is different from a second authentication vector of the user terminal and has at least one associated key that is isolated from a key associated with the second authentication vector, wherein the first authentication vector is a $5^{th}$ generation (5G) GBA authentication vector, and wherein the second authentication vector is used by the user terminal in authentication for non-$5^{th}$ generation GBA transmission and comprises at least one of a $3^{rd}$ generation/$4^{th}$ generation (3G/4G) GBA authentication vector or a 5G authentication vector.

2. The method according to claim 1, wherein the first authentication vector is an authentication vector with 5-tuple parameters (CK', IK', RAND, AUTN, XRES), and wherein XRES is an expected response;
wherein the second authentication vector is an authentication vector with 5-tuple parameters (CK, IK, RAND, AUTN, XRES); and
wherein at least one of the cipher key CK' is different from the cipher key CK, or the integrity protection key IK' is different from the integrity protection key IK.

3. The method according to claim 2, wherein at least one of:
parameters used to derive the CK' comprise the RAND, a root key K, and a derivation parameter $y_1$, and wherein parameters used to derive the IK' comprise the RAND, the root key K, and a derivation parameter $y_2$;
a derivation function $f_3'$ used to derive the CK' is different from a derivation function $f_3$ used to derive the CK, and wherein a derivation function $f_4'$ used to derive the IK' is different from a derivation function $f_4$ used to derive the IK;
the CK' and the IK' are derived from the CK, the IK, and a first parameter (FC) value, and wherein the first FC value is different from a second FC value used to derive the second authentication vector; or
a first sequence number (SQN) is to be used to derive the AUTN in the first authentication vector, and wherein a second SQN is to be used to derive the AUTN in the second authentication vector, wherein the first SQN and the second SQN each comprise a flag bit, and wherein the flag bit of the first SQN is different from the flag bit of the second SQN.

4. The method according to claim 3, wherein at least one of the parameter $y_1$ or the parameter $y_2$ comprises one or more of a string 5G GBA, a string GBA, a 5G GBA dedicated identifier, a bootstrapping server function (BSF) identifier, a 5G identifier, a counter, a nonce, or a sequence number.

5. The method according to claim 1, wherein the first authentication vector is an authentication vector with 4-tuple parameters ($K_{gba}$, RAND, AUTN, XRES), and wherein XRES is an expected response; and
wherein the second authentication vector is at least one of an authentication vector with 5-tuple parameters (CK, IK, RAND, AUTN, XRES) or an authentication vector with 4-tuple parameters ($K_{ausf}$, RAND, AUTN, XRES), wherein derivation parameters used to derive the key $K_{gba}$ comprise the cipher key CK, the integrity protection key IK, and a parameter $y_2$.

6. A terminal device, comprising:
a transceiver;

at least one processor; and
one or more non-transitory memories coupled to the at least one processor and storing programming instructions for execution by the at least one processor, wherein the programming instructions include instructions to:
send a generic bootstrapping architecture (GBA) authentication request carrying a user terminal identifier;
receive an authentication request carrying an authentication token (AUTN) and a random number (RAND); and
derive a first authentication vector based on the AUTN and the RAND, wherein the first authentication vector is different from a second authentication vector of the user terminal and has at least one associated key that is isolated from a key associated with the second authentication vector, wherein the first authentication vector is a $5^{th}$ generation (5G) GBA authentication vector, and wherein the second authentication vector is used by the user terminal in authentication for non-$5^{th}$ generation GBA transmission and comprises at least one of a $3^{rd}$ generation (3G)/$4^{th}$ generation (3G) GBA authentication vector or a 5G authentication vector.

7. The terminal device according to claim 6, wherein the first authentication vector is an authentication vector with 5-tuple parameters (CK', IK', RAND, AUTN, XRES), and wherein XRES is an expected response;
wherein the second authentication vector is an authentication vector with 5-tuple parameters (CK, IK, RAND, AUTN, XRES); and
wherein at least one of the cipher key CK' is different from the cipher key CK, or the integrity protection key IK' is different from the integrity protection key IK.

8. The terminal device according to claim 7, wherein at least one of:
parameters used to derive the CK' comprise the RAND, a root key K, and a derivation parameter $y_1$, and wherein parameters used to derive the IK' comprise the RAND, the root key K, and a derivation parameter $y_2$;
a derivation function $f_3'$ used to derive the CK' is different from a derivation function $f_3$ used to derive the CK, and wherein a derivation function $f_4'$ used to derive the IK' is different from a derivation function $f_4$ used to derive the IK;
the CK' and the IK' are derived from the CK, the IK, and a first parameter (FC) value, and wherein the first FC value is different from a second FC value used to derive the second authentication vector; or
a first sequence number (SQN) is to be used to derive the AUTN in the first authentication vector, and wherein a second SQN is to be used to derive the AUTN in the second authentication vector, wherein the first SQN and the second SQN each comprise a flag bit, and wherein the flag bit of the first SQN is different from the flag bit of the second SQN.

9. The terminal device according to claim 8, wherein at least one of the parameter $y_1$ or the parameter $y_2$ comprises one or more of a string 5G GBA, a string GBA, a 5G GBA dedicated identifier, a bootstrapping server function (BSF) identifier, a 5G identifier, a counter, a nonce, or a sequence number.

10. The terminal device according to claim 6, wherein the first authentication vector is an authentication vector with 4-tuple parameters ($K_{gba}$, RAND, AUTN, XRES), and wherein XRES is an expected response;
wherein the second authentication vector is at least one of an authentication vector with 5-tuple parameters (CK, IK, RAND, AUTN, XRES) or an authentication vector with 4-tuple parameters ($K_{ausf}$, RAND, AUTN, XRES), wherein derivation parameters used to derive the key $K_{gba}$ comprise the cipher key CK, the integrity protection key IK, and a parameter $y_2$.

11. A non-transitory computer-readable storage medium storing instructions causing at least one processor to perform:
sending a generic bootstrapping architecture (GBA) authentication request carrying a user terminal identifier;
receiving an authentication request carrying an authentication token (AUTN) and a random number (RAND); and
deriving a first authentication vector based on the AUTN and the RAND, wherein the first authentication vector is different from a second authentication vector of the user terminal and has at least one associated key that is isolated from a key associated with the second authentication vector, wherein the first authentication vector is a $5^{th}$ generation (5G) GBA authentication vector, and wherein the second authentication vector is used by the user terminal in authentication for non-$5^{th}$ generation GBA transmission and comprises at least one of a $3^{rd}$ generation (3G)/$4^{th}$ generation (3G) GBA authentication vector or a 5G authentication vector.

12. The non-transitory computer-readable storage medium according to claim 11, wherein the first authentication vector is an authentication vector with 5-tuple parameters (CK', IK', RAND, AUTN, XRES), and wherein XRES is an expected response;
wherein the second authentication vector is an authentication vector with 5-tuple parameters (CK, IK, RAND, AUTN, XRES); and
wherein at least one of the cipher key CK' is different from the cipher key CK, or the integrity protection key IK' is different from the integrity protection key IK.

13. The non-transitory computer-readable storage medium according to claim 12, wherein at least one of:
parameters used to derive the CK' comprise the RAND, a root key K, and a derivation parameter $y_1$, and wherein parameters used to derive the IK' comprise the RAND, the root key K, and a derivation parameter $y_2$;
a derivation function $f_3'$ used to derive the CK' is different from a derivation function $f_3$ used to derive the CK, and wherein a derivation function $f_4'$ used to derive the IK' is different from a derivation function $f_4$ used to derive the IK;
the CK' and the IK' are derived from the CK, the IK, and a first parameter (FC) value, and the first FC value is different from a second FC value used to derive the second authentication vector; or
a first sequence number (SQN) is to be used to derive the AUTN in the first authentication vector, and a second SQN is to be used to derive the AUTN in the second authentication vector, wherein the first SQN and the second SQN each comprise a flag bit, and wherein the flag bit of the first SQN is different from the flag bit of the second SQN.

14. The non-transitory computer-readable storage medium according to claim 13, wherein at least one of the parameter $y_1$ or the parameter $y_2$ comprises one or more of a string 5G GBA, a string GBA, a 5G GBA dedicated identifier, a bootstrapping server function (BSF) identifier, a 5G identifier, a counter, a nonce, or a sequence number.

15. The non-transitory computer-readable storage medium according to claim 11, wherein the first authentication vector is an authentication vector with 4-tuple parameters ($K_{gba}$, RAND, AUTN, XRES), and wherein XRES is an expected response;

wherein the second authentication vector is at least one of an authentication vector with 5-tuple parameters (CK, IK, RAND, AUTN, XRES) or an authentication vector with 4-tuple parameters ($K_{ausf}$, RAND, AUTN, XRES), and wherein derivation parameters used to derive the key $K_{gba}$ comprise the cipher key CK, the integrity protection key IK, and a parameter $y_2$.

* * * * *